US010089876B1

(12) United States Patent
Ramasamy et al.

(10) Patent No.: US 10,089,876 B1
(45) Date of Patent: Oct. 2, 2018

(54) SYSTEMS AND METHODS FOR COORDINATED LANE-CHANGE NEGOTIATIONS BETWEEN VEHICLES

(71) Applicant: QUALCOMM Incorporated, San Diego, CA (US)

(72) Inventors: Bala Ramasamy, San Diego, CA (US); Arnold Gum, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/697,236

(22) Filed: Sep. 6, 2017

(51) Int. Cl.
  G08G 1/16 (2006.01)
  G05D 1/02 (2006.01)
  H04L 29/08 (2006.01)
  G05D 1/00 (2006.01)

(52) U.S. Cl.
  CPC .......... G08G 1/162 (2013.01); G05D 1/0022 (2013.01); G05D 1/028 (2013.01); G05D 1/0231 (2013.01); G08G 1/167 (2013.01); H04L 67/12 (2013.01)

(58) Field of Classification Search
  CPC ...... G08G 1/162; G08G 1/167; G05D 1/0022; G05D 1/0231; G05D 1/028; H04L 67/12
  See application file for complete search history.

(56) References Cited

U.S. PATENT DOCUMENTS

| 9,550,528 | B1 | 1/2017 | Hakeem et al. | |
|---|---|---|---|---|
| 2013/0338868 | A1* | 12/2013 | Essame | B60W 30/18163 701/23 |
| 2014/0107867 | A1* | 4/2014 | Yamashiro | G08G 1/22 701/2 |
| 2015/0194055 | A1* | 7/2015 | Maass | B60W 50/14 340/905 |
| 2016/0304097 | A1* | 10/2016 | Taira | B60W 30/18163 |
| 2017/0076607 | A1 | 3/2017 | Linder et al. | |
| 2017/0082452 | A1 | 3/2017 | Sumizawa | |
| 2017/0287331 | A1* | 10/2017 | Laur | G08G 1/161 |
| 2017/0330461 | A1* | 11/2017 | Caveney | B60W 30/0953 |
| 2018/0079419 | A1* | 3/2018 | Yamamoto | B60R 21/00 |

FOREIGN PATENT DOCUMENTS

WO 2016147623 A1 9/2016

OTHER PUBLICATIONS

Nie J., et al., "Decentralized Cooperative Lane-Changing Decision-Making for Connected Autonomous Vehicles", IEEE Access, 2016, vol. 4, pp. 9413-9420.

* cited by examiner

*Primary Examiner* — Michael J Zanelli
(74) *Attorney, Agent, or Firm* — Kilpatrick Townsend & Stockton, LLP

(57) ABSTRACT

One disclosed example method for coordinated lane-change negotiations between vehicles includes receiving, by a computing device of a first vehicle, a lane change request from a requesting vehicle, the requesting vehicle requesting to change to a lane of travel occupied by the first vehicle; identifying, by the computing device, a second vehicle in the lane of travel; coordinating with the second vehicle to establish a space to accommodate the requesting vehicle in the lane of travel; and transmitting a lane change response to the requesting vehicle. In some examples, methods may further include determining a distance between the first and second vehicles; determining a minimum distance to establish the space; and communicating the minimum distance and a command to change a travelling speed to the second vehicle to establish the space.

29 Claims, 16 Drawing Sheets

SYSTEMS AND METHODS FOR COORDINATED LANE-CHANGE NEGOTIATIONS BETWEEN VEHICLES

BACKGROUND

While travelling down a multi-lane road, vehicles often need to change lanes to avoid slower traffic or to exit the roadway. In vehicles being manually operated by a driver, the driver is able to identify gaps between vehicles in an adjacent lane into which the driver's vehicle can merge. Similarly, autonomous or semi-autonomous vehicles may be able to identify gaps between cars in an adjacent lane and perform a merge. However, if no such gap exists, the vehicle or driver must either wait for a suitable gap to appear or adjust their speed to move into a gap ahead or behind the cars in the adjacent lane.

BRIEF SUMMARY

Various examples are described for systems and methods for coordinated lane-change negotiations between vehicles.

One example method includes receiving, by a computing device of a first vehicle, a lane change request from a requesting vehicle, the requesting vehicle requesting to change to a lane of travel occupied by the first vehicle; identifying, by the computing device, a second vehicle in the lane of travel; coordinating with the second vehicle to establish a space to accommodate the requesting vehicle in the lane of travel; and transmitting a lane change response to the requesting vehicle.

One example device includes a radio frequency (RF) transceiver; a non-transitory computer-readable medium; and a processor in communication with the RF transceiver and the non-transitory computer-readable medium, the processor configured to execute processor-executable program code stored in the non-transitory computer-readable medium to: receive a lane change request from a requesting vehicle, the requesting vehicle requesting to change to a lane of travel occupied by a first vehicle comprising the device; identify a second vehicle in the lane of travel; coordinate with the second vehicle to establish a space to accommodate the requesting vehicle in the lane of travel; and transmit a lane change response to the requesting vehicle.

One example apparatus includes means for receiving a lane change request from a requesting vehicle, the requesting vehicle requesting to change to a lane of travel occupied by a first vehicle comprising the apparatus; means for identifying a second vehicle in the lane of travel; means for coordinating with the second vehicle to establish a space to accommodate the requesting vehicle in the lane of travel; and means for transmitting a lane change response to the requesting vehicle.

One example non-transitory computer-readable medium includes processor-executable program code stored in the non-transitory computer-readable medium to cause a processor to receive a lane change request from a requesting vehicle, the requesting vehicle requesting to change to a lane of travel occupied by a first vehicle comprising the device; identify a second vehicle in the lane of travel; coordinate with the second vehicle to establish a space to accommodate the requesting vehicle in the lane of travel; and transmit a lane change response to the requesting vehicle.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Examples are described herein in the context of systems and methods for coordinated lane-change negotiations between vehicles. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Partially-automated and automated vehicles may begin to become more prevalent on public roadways and will need to be able to manage roadways having multiple lanes of travel, including changing lanes without driver assistance. For example, a vehicle travelling down a multi-lane roadway may determine that it needs to change lanes, such as based on route information from its navigation system. However, the vehicle cannot simply change lanes as other vehicles may be occupying the desired lane of travel. Thus, the vehicle must first attempt to coordinate its lane change with the other vehicles travelling on the road.

In this example, a vehicle (the "requesting vehicle") transmits an indication that it would like to change to a new lane of travel, and one or more nearby vehicles receive the indication, which may be a turn signal, hand or arm signal, or a message transmitted via an RF transmitter. The nearby cars determine whether they are the appropriate vehicles to respond, e.g., based on proximity to the requesting vehicle and their respective current lanes of travel. After the vehicles determine that they are in the desired lane of travel, the attempt to coordinate with each other to accommodate the request.

Figure 1:
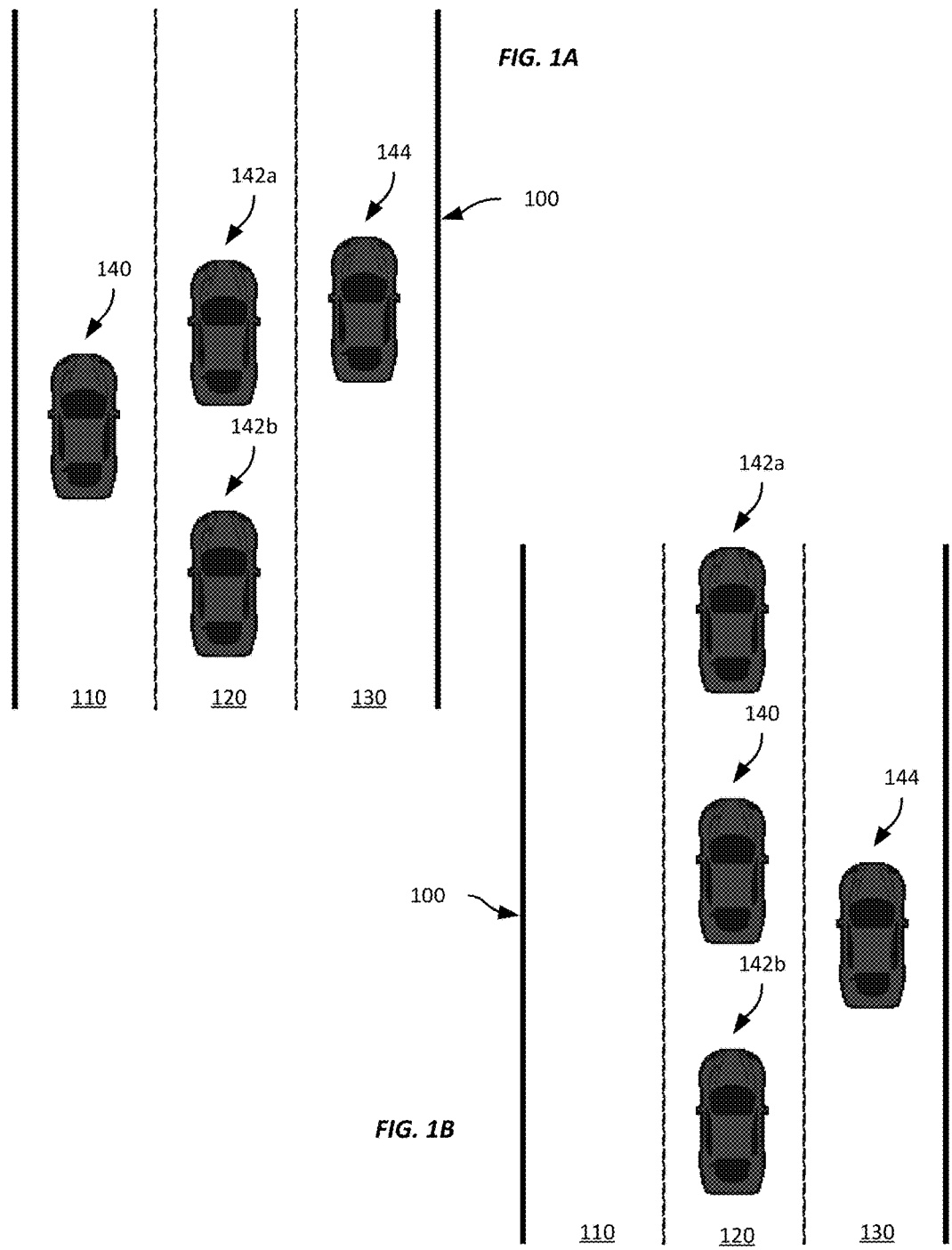
FIGS. 1A-1B show an example lane change scenario according to one example method for coordinated lane-change negotiations between vehicles.

Referring now to FIG. 1A, FIG. 1A illustrates the road 100 in this illustrative example and has several lanes 110-130 for travel in a particular direction. The requesting vehicle 140 is travelling in the left-most lane 110, while the responding vehicles 142a-b (i.e., first vehicle 142a and second vehicle 142b) are travelling in the middle lane 120 of the road 100. In addition, another vehicle, third vehicle 144, is also travelling on the road 100. But in this example, third vehicle 144 ignores the request as it is not in the middle lane 120. It should be appreciated that the labels "first," "second," "third," etc. are not intended to indicate a sequence or ordering, but rather simply to distinguish different vehicles from each other.

In this example, the responding vehicle 142a-b identify other vehicles in the lane 120 using a light detection and ranging (LIDAR); radio detection and ranging (RADAR); wireless communication techniques, including broadcast and point-to-point techniques; or a computer vision (CV) system. After identifying nearby vehicles, if any, the responding vehicles 142a-b determine whether to accommodate the requested lane change by helping to establish sufficient space in the lane.

In this example, the responding vehicles 142a-b determine to allow the requesting vehicle 140 to merge into the lane ahead of responding vehicle 142b. The responding vehicles 142a-b then exchange messages to coordinate the lane change request. In this example, vehicle 142a accelerates by three miles per hour for a time until the distance between vehicle 142b and vehicle 142a is at least 50 feet. Vehicle 142b also reduces its speed by 3 miles per hour. After a period of time, the space between the vehicles 142a-b expands to at least 50 feet, at which time, one or both responding vehicles 142a-c transmit a message to the requesting vehicle 140 indicating that a space has been created between the vehicles 142a-b, and that the requesting vehicle 140 may merge into it. The requesting vehicle 140 then adjusts its speed and position until it is alongside the created space, and then changes lanes into the space. The requesting vehicle 140 then transmits a response to the responding vehicles 142a-b indicating that the requesting vehicle 140 has merged into the space, which each respond with an acknowledgement message. Each of the three vehicles then resumes ordinary operation, which may include further increasing the space between the three vehicles to a safe amount of inter-vehicle separation.

This illustrative example is not intended to be in any way limiting, but instead is intended to provide an introduction to the subject matter of the present application. For example, the illustrative example above is described with respect to an autonomous car; however, the present application is not limited to such an environment, but may be used in any suitable environment. Other examples of autonomous vehicle lane assignment are described below.

Figure 2:
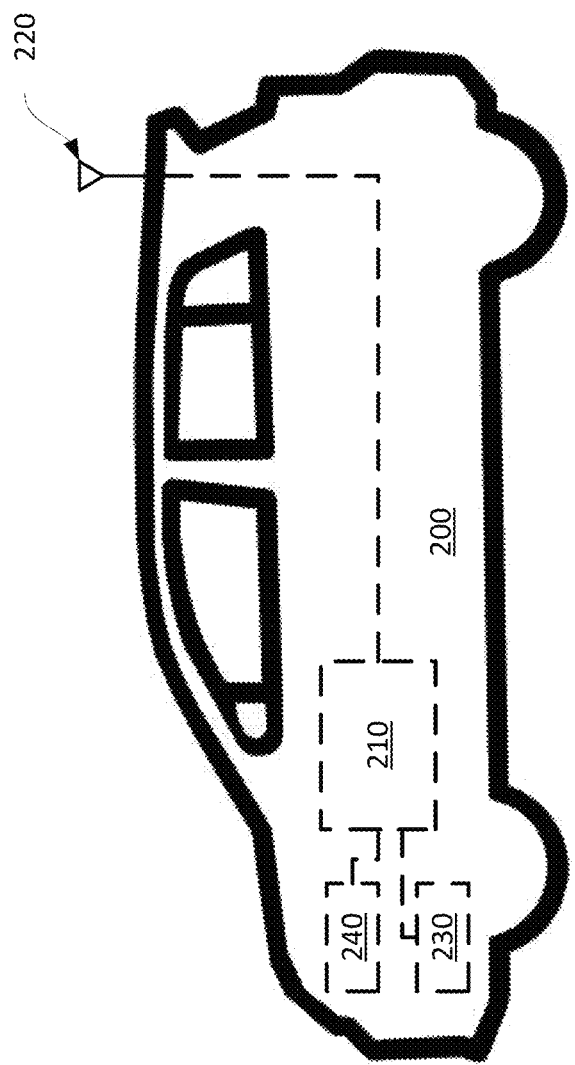
FIGS. 2 and 3 show example devices and systems for coordinated lane-change negotiations between vehicles.

Referring now to FIG. 2, FIG. 2 shows an example system for coordinated lane-change negotiations between vehicles. In the example shown in FIG. 2, a vehicle 200 has been equipped with a computing device 210 in communication with an antenna 220 and one or more sensors 230, 240. The computing device 210 is configured to receive radio signals from the antenna 220, and in some examples, may be configured to transmit radio signals using the antenna 220. For example, the computing device 210 may be configured to transmit signals that may be employed by other suitable computing devices, such as may be affixed to other vehicles. Such signals may include requests from a requesting vehicle to change lanes, responses from a responding vehicle to the requesting vehicle, or commands from the responding vehicle to one or more other vehicles. In some examples, signals may be transmitted in a point-to-point fashion, e.g., by using a directional antenna; in some examples, signals may be broadcast to all vehicles within a reference range from the transmitter, e.g., all vehicles within 200 meters of the transmitter.

Signals transmitted by a requesting vehicle using a wireless transceiver, such as a lane change request, may include information such as a priority level of the vehicle 200, an identifier for the vehicle 200 or computing device 210, one or more dimensions of the vehicle 200, a lane of travel of the vehicle 200, a speed of the vehicle 200, a heading of the vehicle 200, or other vehicle information. Signals from the responding or requesting vehicles may include information about a space established in a lane of travel, commands to other vehicles, such as to accelerate or reduce speed, information about proximity of other vehicles, responses to commands, etc.

It should be noted that the locations of the computing device 210 and the antenna 220 shown in FIG. 2 are merely examples, and in other examples, any suitable location within the vehicle 200 or other vehicle may be used. Further, the computing device 210 may be integrated within an autonomous or semi-autonomous vehicle and be configured to communicate with other vehicle systems to provide commands to change vehicle speed, such as by transmitting a new desired vehicle speed, providing a command to change throttle application or to apply brakes, obtain route or position information from a navigation system, or provide notifications or prompts to a driver or other occupant of the vehicle.

As shown in FIG. 2, the vehicle 200 may be equipped with one or more sensors 230, 240 of the same or different types. In some examples, sensors 240 may comprise proximity sensors configured to detect other vehicles within a reference range of the vehicle, or to detect a range to a detected vehicle. Some example sensors may include image sensors, ultrasound range sensors, laser range sensors, LIDAR, radar, or other suitable proximity sensors, which can be means for determining a distance between a first and a second vehicle, a means for identifying a vehicle in a lane of travel, or a means for identifying a travelling order of two or more vehicles. Image or light sensors, including one or more cameras, may be employed to detect signals from other vehicles, such as turn signals, brake lights, headlights, hand or arm signals, etc. One or more sensors 230, 240 may be affixed to the vehicle, such as on the front, sides, and rear of the vehicle 200. In some examples, an omnidirectional sensor, such as a LIDAR or radar system, may be affixed to the roof of the vehicle 200. Such sensors can serve as a means for detecting an activated turn signal on a requesting vehicle, or a means for identifying a vehicle in a lane of travel, or a means for identifying a travelling order of two or more vehicles.

The computing device 210 may further function as, or be in communication with, a navigation system of the vehicle 200. The computing device 210 may be configured in some examples to access navigation information, such as preprogrammed route information or location information that may be employed for coordinated lane-change negotiations between vehicles.

Figure 3:
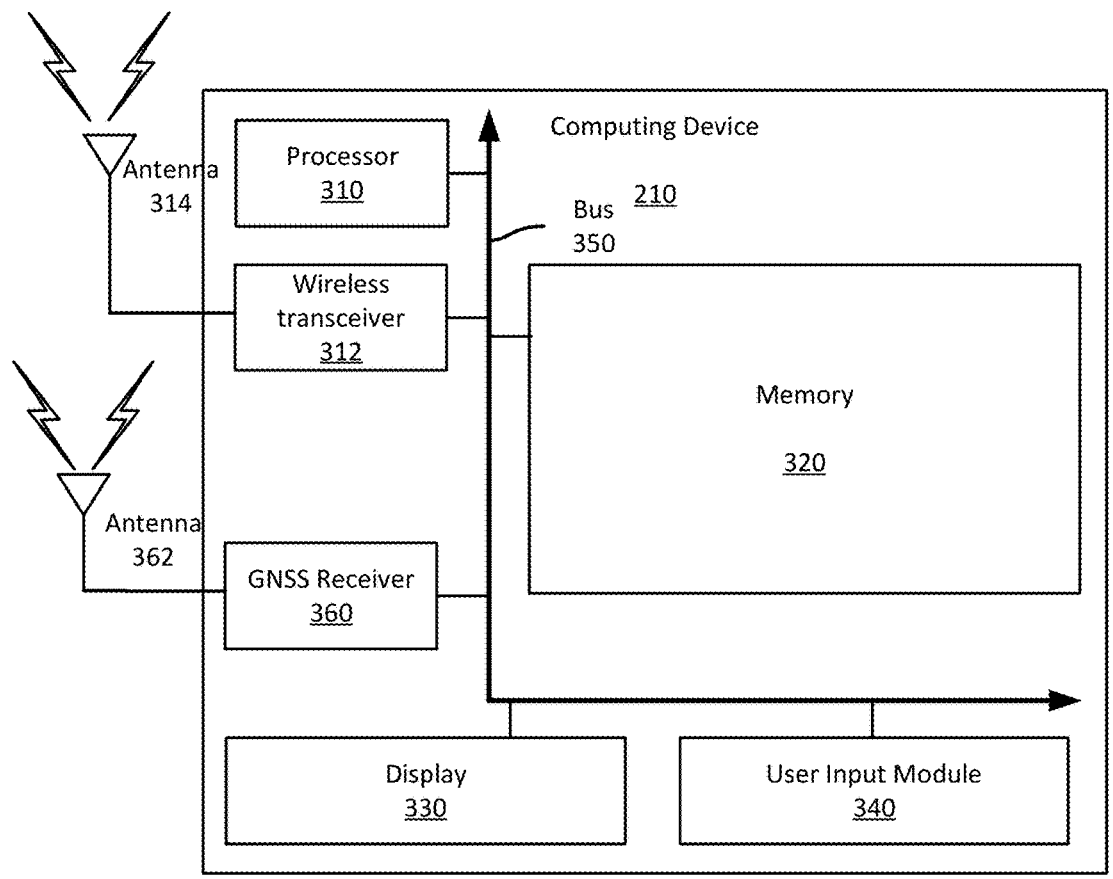

FIG. 3 shows a more detailed view of the example computing device 210 shown in FIG. 2. In the example shown in FIG. 3, the mobile device includes a processor 310, a memory 320, a wireless transceiver 312, a Global Navigation Satellite System (GNSS) receiver 360, e.g., Global Positioning System (GPS), GNSS antenna 362, a display 330, a user input module 340, and a communications bus 350. In this example, the computing device 210 comprises a vehicle-based navigation system, but may be any suitable device, include an embedded computing device, a cellular phone, a laptop computer, a tablet, a phablet, a personal digital assistant (PDA), wearable device, or an augmented or virtual reality device. The processor 310 is configured to employ communications bus 350 to execute program code stored in memory 320, to output display signals to a display 330, and to receive input from the user input module 340. In addition, the processor 310 is configured to receive information from the GNSS receiver 360 and wireless transceiver 312 and to transmit information to the wireless transceiver 312.

The wireless transceiver 312 is configured to transmit and receive wireless signals via antenna 314. For example, the wireless transceiver 312 may be configured to receive radio signals from any suitable wireless signal transmitter. In some examples, the computing device 210 may comprise one or more additional wireless transceivers and associated antennas that may be configured to communicate using multiple wireless techniques, such as with a cellular base station by transmitting signals to and receiving signals from an antenna associated with the cellular base station. The wireless transceiver 312 and/or the antenna 314 can be means for receiving a radio frequency communication from a requesting vehicle, means for communicating a command to increase speed, means for communicating a command to decrease speed, or means for communicating a minimum distance and a command to change a travelling speed as described elsewhere herein. The GNSS receiver 360 is configured to receive signals from one or more GNSS satellites via GNSS antenna 362 and to provide location signals to the processor 310. It should be noted that all of the components shown in the computing device 210 are not required in various examples. For example, the GNSS receiver 360 and GNSS antenna 362 are optional as are the display 330, and user input module 340.

Figure 4A:
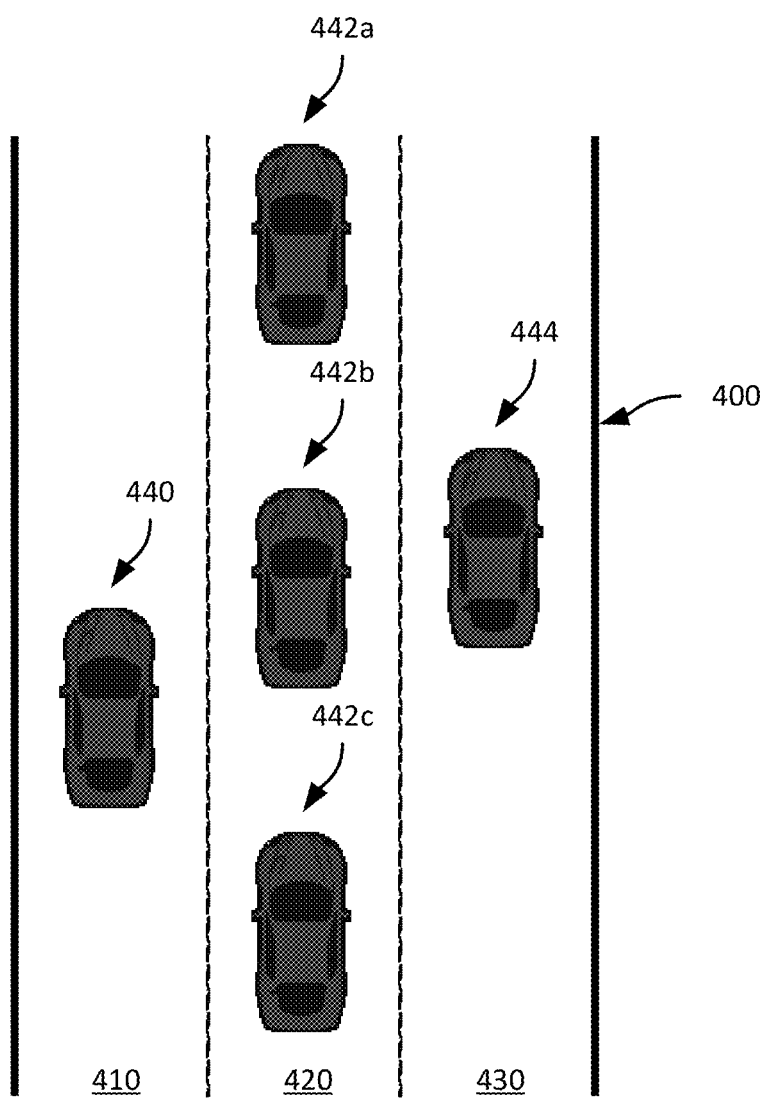
FIGS. 4A-4C show an example lane change scenario according to one example method for coordinated lane-change negotiations between vehicles.
Figure 4B:
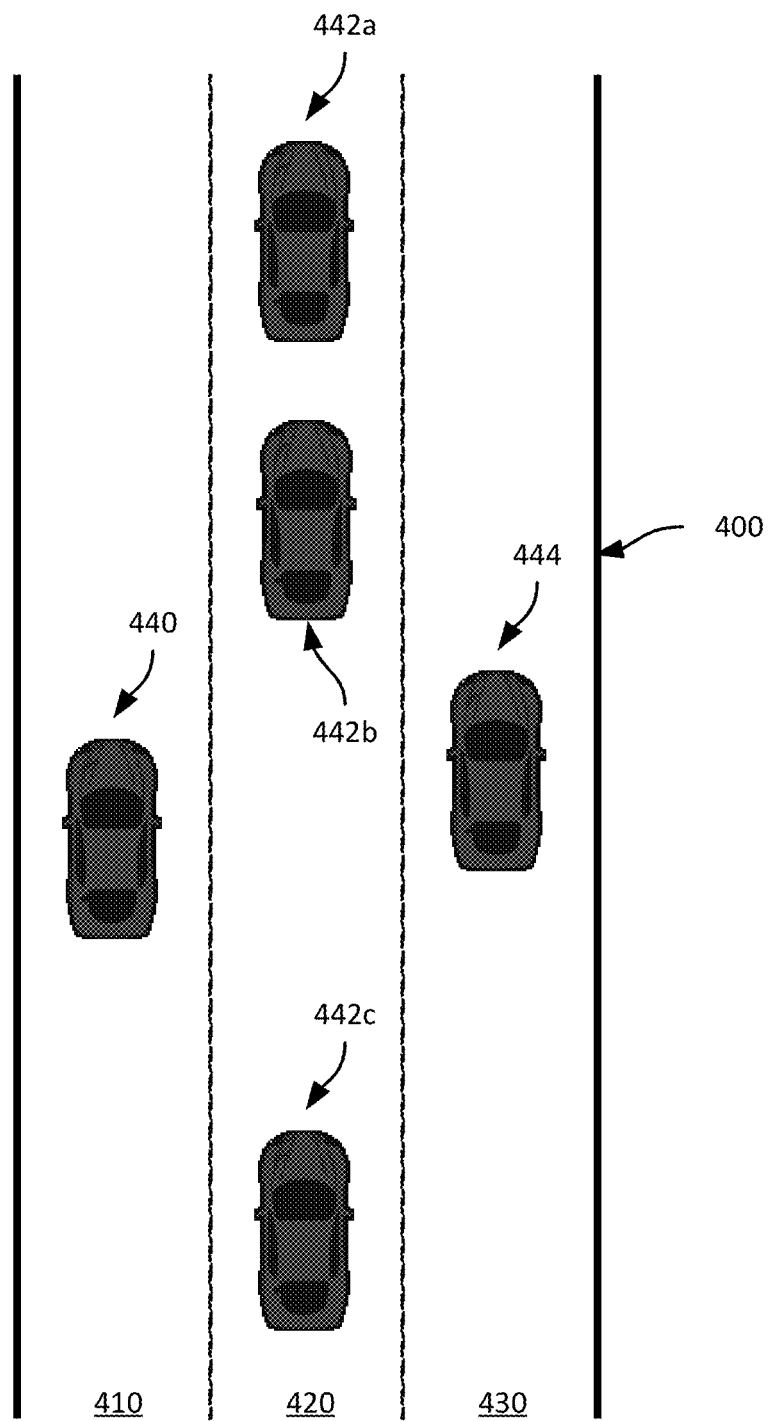
Figure 4C:
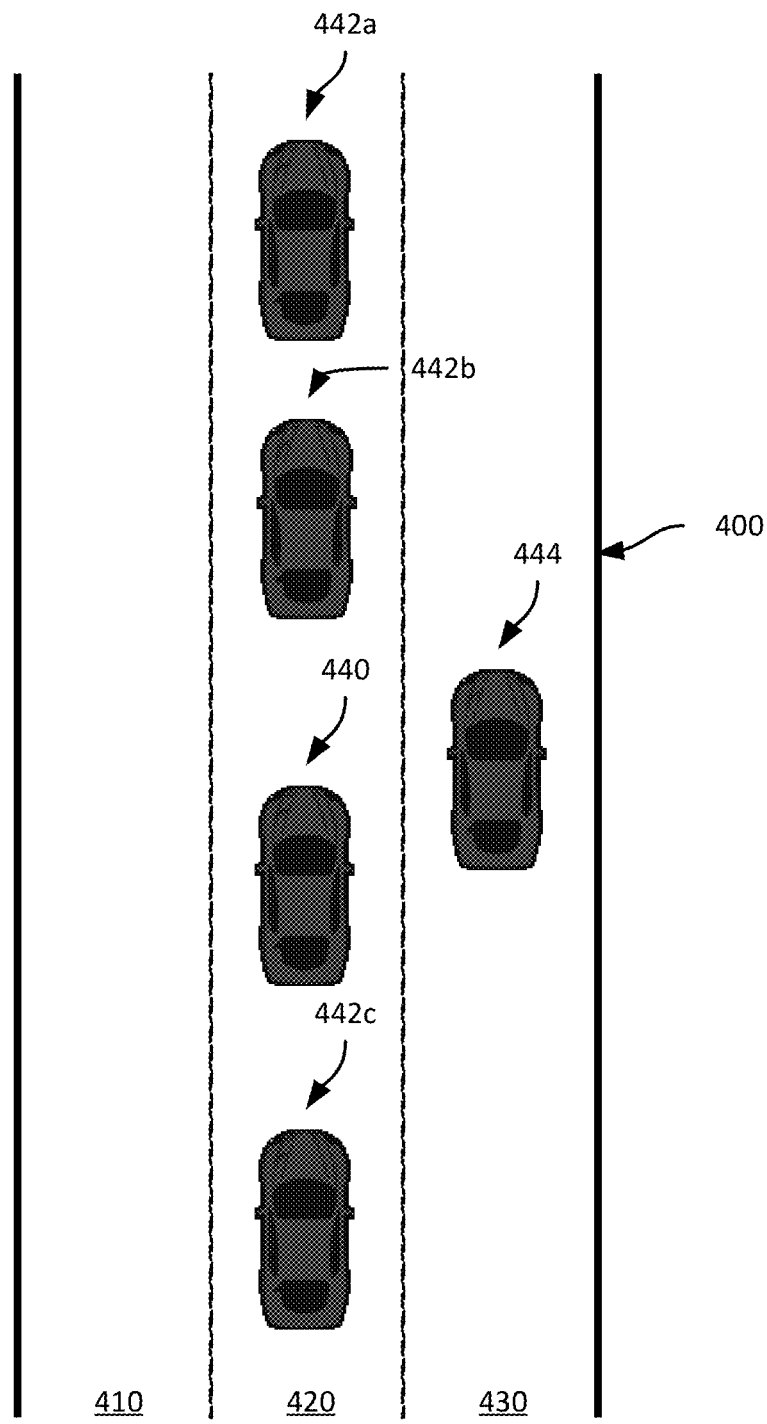

Referring now to FIGS. 4A-4C, FIGS. 4A-4C show an example coordinated lane change environment and scenario. The examples shown in FIGS. 4A-4C are meant to be illustrative of various traffic scenarios on a roadway and are also applicable to various road configurations, e.g., roadways with a greater or lesser number of lanes, or with lighter or heavier traffic. The example shown in FIGS. 4A-4C involve a first vehicle (the "requesting vehicle") communicating with one of the vehicles in the middle lane (the "responding vehicle") to coordinate a lane change with a second vehicle (the "commanded vehicle"). And while this example only involves coordination between the responding vehicle and a second vehicle, in some examples, the responding vehicle may coordinate with a second vehicle, a third vehicle, etc.

FIG. 4A illustrates a scenario in which a vehicle 440 (the "requesting vehicle") determines a need to change from its lane of travel in the left lane 410 to the center lane 420 of the road 400. In this example, the requesting vehicle 440 is operating in an autonomous driving mode wherein the vehicle's navigation system interoperates with other vehicle control systems, e.g., collision avoidance, lane management, adaptive cruise control, etc., to operate the vehicle on the road 400 to a programmed destination. In this case, the programmed destination has been entered into the vehicle's navigation system, which now indicates that the requesting vehicle 440 needs to move to a right lane 430 to exit the road 400; however in some examples, the vehicle 440 may receive an indication of a need to change lanes from a remote source, such as a traffic management system. Further, the vehicle 440 may determine a need to change lanes based on multiple different factors, including the vehicle's operating mode, e.g., an automated scenic driving mode, an emergency mode, a manual mode, etc.; an approaching emergency vehicle or an emergency vehicle located on a shoulder; detected wireless charging functionality embedded within a road surface in a different lane; road or lane conditions; obstructions or hazards, such as debris, standing water, disabled vehicles; lane types, such as high-occupancy vehicle lanes, express lanes, local lanes, etc.; or any other factors. However, to move to the right lane 430 from the left lane 410, the vehicle 440 first must merge into the middle lane 420.

In this scenario, the road 400 may be occupied by a variety of different vehicles, some of which may be autonomous, some may be semi-autonomous, and others may be operated manually by their respective drivers. To effect an automatic lane change, the requesting vehicle 440 attempts to coordinate a lane change maneuver with the vehicles 442a-c (i.e., vehicles 442a, 442b, and 442c) travelling in the middle lane 420. In this example, the vehicle 440 transmits an RF request to the vehicles 442a-c in the middle lane 420, thereby becoming the requesting vehicle 440. The request in this case is broadcast by an RF transmitter within the requesting vehicle 440 with, in this example, a range of approximately 200 meters; however, in some examples, a request may be transmitted via a point-to-point communications technique. In this example, the request includes information about the requesting vehicle 440, such as its lane of travel, a then-present location of the vehicle, its speed, the target lane for the lane change, the make and model of the requesting vehicle 440, a priority for the request, and an acceptable minimum space needed to merge into the lane.

The vehicles 442a-c travelling in the center lane 420 that are equipped with RF receivers may receive the request and process it, such as to determine whether the receiving vehicle is one that needs to respond to the request. For example, after receiving the request, each capable vehicle 442b-c determines its position relative to the requesting vehicle 440. For example, vehicle 442b may determine that at the time of the request, it was located slightly forward of the requesting vehicle's position, while vehicle 442c may determine that it was located slightly behind the requesting vehicle's position. In this example, vehicle 442a lacks an RF receiver and does not receive the request from the requesting vehicle 440. Means for performing such a function include the computing device 210 of FIG. 2 and the processor 310 of FIG. 3.

Each of the receiving vehicles 442b-c then determines whether it is capable of coordinating a lane change maneuver for the requesting vehicle 440. If either or both is capable of doing so, each may transmit a message to other vehicles 442a-c travelling it the same lane indicating that the vehicle is capable of coordinating the lane change. Such an indication may include a numerical value indicating a qualitative indication of its capability of coordinating the lane change, e.g., on a scale of 1 to 10. The qualitative indication may be based on other factors as well, such as proximity to the requesting vehicle, existing space in the lane near the vehicle, etc. The vehicles 442b-c may then negotiate to determine which will actually coordinate the move. For example, in this example, vehicle 442b determines that it is capable of coordinating because it is travelling in the appropriate lane 420 and is operating in an autonomous mode, and thus has full control over the vehicle's function. Further, in this example, it determines that it is the frontmost vehicle in the coordination process since it is travelling in front of vehicle 442c and no vehicle in the lane ahead of it is participating in the coordinated lane change. Vehicle 442c may make a similar determination, and further determines that it is the rearmost vehicle in the coordination process since it is travelling behind vehicle 442n and no vehicle in the lane behind it is participating in the coordinated lane change. Each then transmits its respective capability of coordinating the move.

Thus, each of vehicles 442b-c receive an indication that the other is capable of coordinating the move. However, for example, vehicle 442b then determines that, despite sensing vehicle 442a with a LIDAR sensor, no communications have been received from the vehicle 442a. Thus, vehicle 442b may then transmit an indication that its ability to coordinate the move is reduced due to a non-responsive vehicle ahead of it. Vehicle 442c does not detect such an issue and thus does not negatively weight its ability to coordinate a lane change. Thus, the vehicles 442b-c determine that vehicle 442c has a better qualitative capability to coordinate the lane change and designate vehicle 442c as the responding vehicle 442c that will both coordinate the lane change and communicate with the requesting vehicle 440. The vehicles 442b-c also designate vehicle 442b as the commanded vehicle, which will respond to requests and commands from the responding vehicle 442c to establish a space for the requesting vehicle 440, but will allow vehicle 442c to coordinate the lane change.

Vehicle 442c then determines a location of the requesting vehicle 440 with respect to the responding vehicle 442c, such as using location information contained in the request (as discussed above), information from one or more sensors, or information received from vehicle 442b. For example, vehicle 442b may detect the requesting vehicle 440 such as by detecting license plate using a CV system. In some examples, a responding vehicle 442b-c may detect the requesting vehicle by detecting a flashing turn signal on another vehicle. To confirm the turn signal is associated with the requesting vehicle 140, a responding vehicle 442b-c may transmit a message to the requesting vehicle 440 to either change a turn signal flash pattern or to flash brake lights, which may then be detected using a sensor, such as a CV system.

The vehicles 442b-c involved in creating a space may also share sensor information to enable the responding vehicle 442c to better coordinate the lane change. For example, vehicle 442b may provide sensor information indicating that it detects vehicle 440 as flashing its turn signal and not detecting any other vehicles in lane 410, thus indicating that vehicle 440 is likely the requesting vehicle. Or in some examples, the requesting vehicle 440 may provide make and model information, which may be recognized by image sensors on vehicles 442b-c. For example, the vehicles 442b-c may capture images of vehicle 440 and compare a logo on the vehicle with the identified make and compare a model number, such as on the trunk lid, front fender, or grille, with the identified make or model number from the request. If the logo or model number match, or both, the responding vehicle 442c may determine that vehicle 440 is the requesting vehicle. In some examples, the request may include a license plate number, and vehicles 442b-c may detect the location of the requesting vehicle 440 based on recognizing the license plate information from one or more images of the vehicle 440.

After detecting the location of the requesting vehicle 440, the responding vehicle 442c may begin coordinating with vehicle 442b to determine whether a space to accommodate the requesting vehicle 440 can be safely established. In one example, this can begin by determining a distance between the responding vehicle 442c and commanded vehicle 442b. Additionally, a minimum distance to establish a space to allow the requesting vehicle to change lanes may also be determined. In one example, the minimum distance is provided in the lane change request. Where the distance between the responding vehicle 442c and the commanded vehicle 442b is less than the minimum distance, the responding vehicle 442c can communicate the minimum distance along with a command to change a travelling speed to the second vehicle to establish the space. For example, the responding vehicle 442c may send a message to commanded vehicle 442b requesting information regarding whether it can accelerate or otherwise increase a separation between it and the responding vehicle 442c. In this example, commanded vehicle 442b responds to the request indicating that it can move 15 feet (approximately 1 car length) closer to the vehicle 442a in front of it. The responding vehicle 442c then determines whether it can safely reduce its speed to create a greater amount of separation between it and the commanded vehicle 442b. The responding vehicle 442c determines that it can safely reduce its speed by five miles per hour (mph) to increase a following distance behind the commanded vehicle 442b. The responding vehicle 442c then determines whether a space can be established between it and the commanded vehicle 442b can be increased to at least the acceptable minimum space specified in the lane change request. In this example, the requesting vehicle has requested an acceptable minimum space of at least 75 feet, or approximately five car lengths. Means for performing the functions discussed above, which include determining a minimum distance to establish a space, include the computing device 210 of FIG. 2 and the processor 310 of FIG. 3

The responding vehicle 442c determines that it is already travelling 45 feet behind the commanded vehicle 442b based on a proximity sensor, e.g., LIDAR or CV system. Thus, the responding vehicle 442c determines that by commanded vehicle 442b to move 15 feet closer to first vehicle 442a, and by reducing its own speed by 5 mph, a space of 75 feet can be established between the responding vehicle 442c and vehicle 442b to accommodate the lane change request.

The responding vehicle 442c then issues a command to the commanded vehicle 442b to move 15 feet closer to first vehicle 442a (for example, a command to commanded vehicle 442b to change its travelling speed to establish the space for requesting vehicle to change lanes), and also reduces its own throttle to reduce its speed by, in this example, 5 mph for approximately two seconds to establish the space, or until a detected distance between it and the commanded vehicle 442b is at least 75 feet.

Referring now to FIG. 4B, FIG. 4B shows the space established between the responding vehicle 442c and the commanded vehicle 442b. As can be seen, the gap between first vehicle 442a and second vehicle 442b has decreased, while the responding vehicle 442c has fallen further behind the requesting vehicle 440 as a result of its reduction in speed.

After the gap has been established, the responding vehicle 442c sends a message to the requesting vehicle 440 indicating that a space in the middle lane 420 between the responding vehicle 442c and the commanded vehicle 442b has been established, such as by indicating the GPS position of each of the vehicles.

Referring now to FIG. 4C, the requesting vehicle 440 has moved into the space between the responding vehicle 442c and the commanded vehicle 442b. The requesting vehicle 440 then transmits a message to the responding vehicle 442c indicating that the lane change has completed successfully. In response, the responding vehicle 442c responds to the requesting vehicle with an acknowledgment message, and also transmits a message to the commanded vehicle 442b indicating that the lane change has completed successfully, which the commanded vehicle 442b responds with an acknowledgment. In the illustrated example, responding vehicle 442c may be considered a first vehicle, for example since it is more involved in coordinating the lane change, and commanded vehicle 442b may be considered a second vehicle. In the illustrated example, prior to the lane change by the requesting vehicle, the second vehicle is directly in front of the first vehicle. However, it is understood that in alternative scenarios, the second vehicle may be directly behind the first vehicle.

The sequence of events shown in FIGS. 4A-4C is intended as an example of how two vehicles in a lane of travel may negotiate in a coordinating vehicle/commanded vehicle relationship to establish a space in the lane for another vehicle 440 to merge in without intervention by a human driver. Example techniques for coordinated lane-change negotiations between vehicles, such as peer-to-peer techniques, are described below. This example is intended to be illustrative, and many other scenarios and techniques are within the scope of this disclosure.

Figure 5:
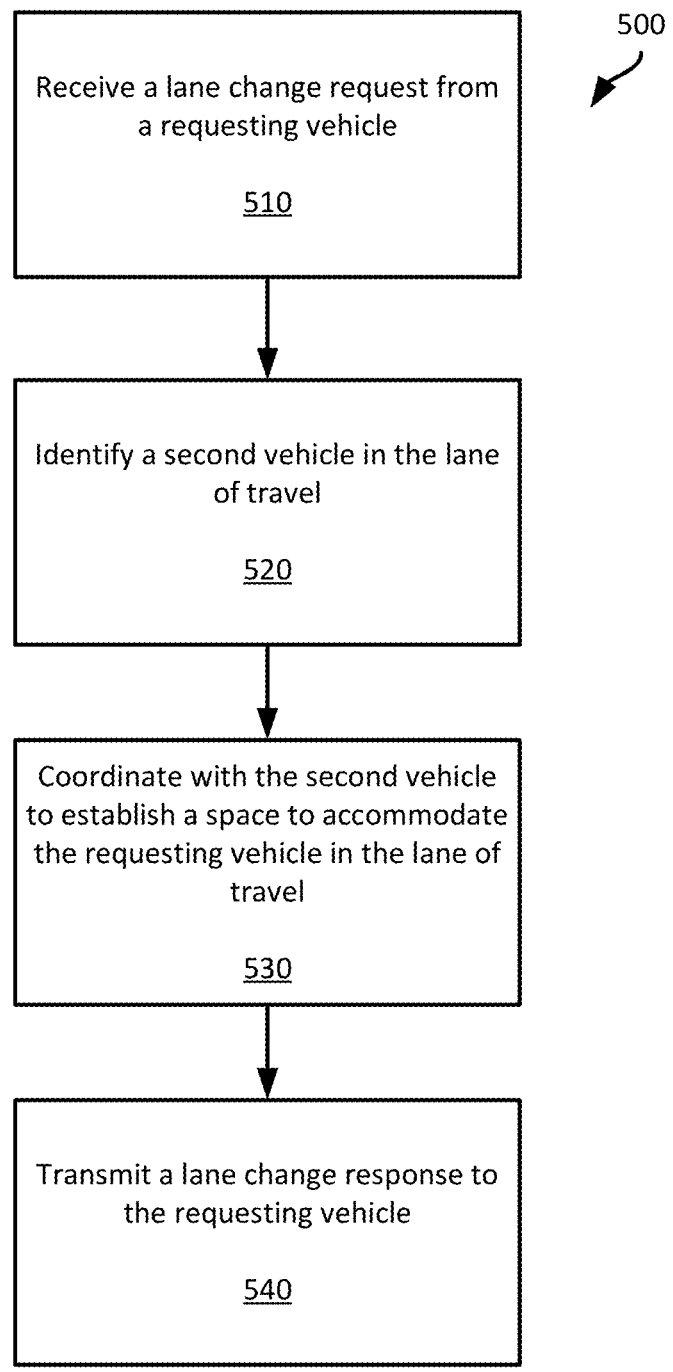
FIG. 5 shows an example method for coordinated lane-change negotiations between vehicles.
Figure 6A:
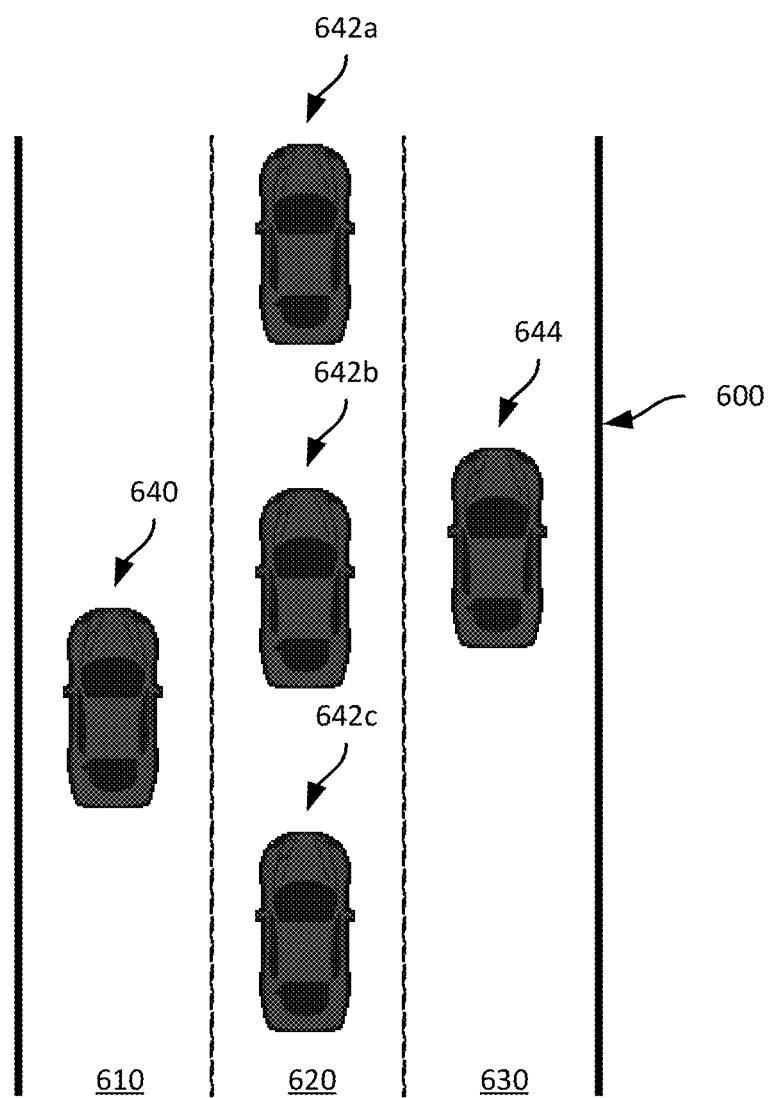
FIGS. 6A-6C, 7A-7C, and 8 show example lane change scenarios according to example methods for coordinated lane-change negotiations between vehicles.
Figure 6B:
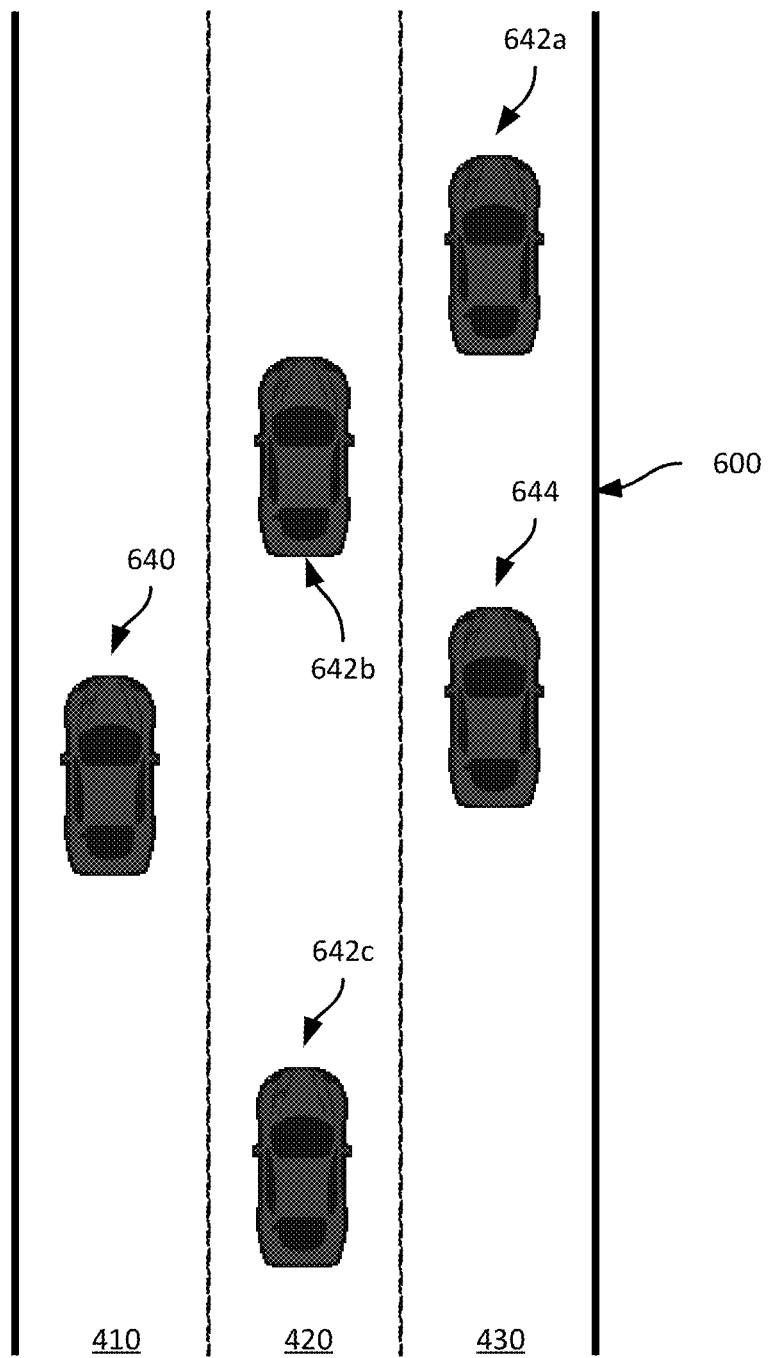
Figure 6C:
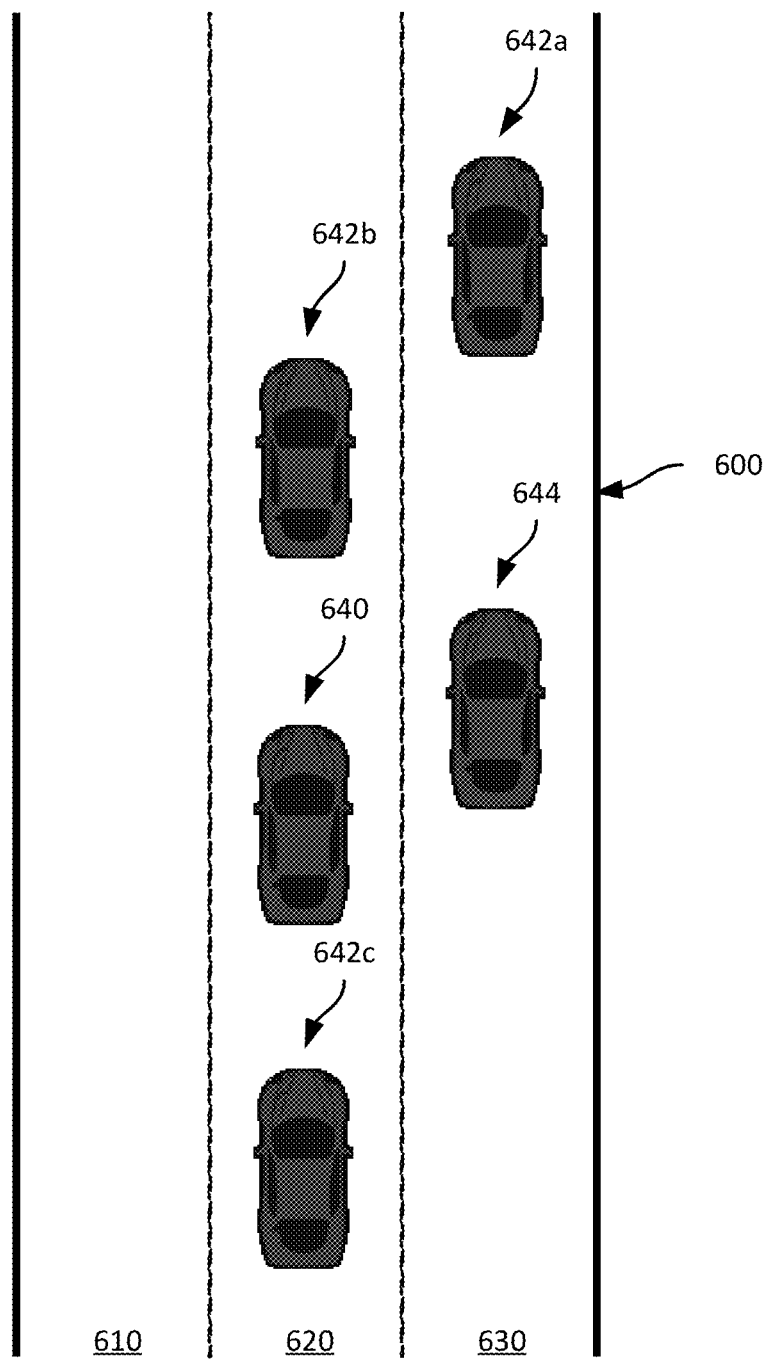

Referring now to FIG. 5, FIG. 5 shows an example method 500 for coordinated lane-change negotiations between vehicles. The method 500 of FIG. 5 will be discussed with respect to the example vehicle 200 shown in FIG. 2, the example computing device 210 shown in FIG. 3, and the example roadway scenario shown in FIGS. 6A-6C. However, it should be appreciated that any suitable vehicle, computing device, or driving environment according to this disclosure may be employed.

At block 510, a vehicle receives a lane change request from a requesting vehicle. In this example, the lane change request is transmitted via an RF transmitter mounted on vehicle 640, and multiple vehicles 642b-c (i.e., vehicles 642b and 642c), 644 receive the lane change request. Each of the receiving vehicles 642b-c, 644 may therefore perform part or all of this method 500. In contrast, vehicle 642a is not equipped with an RF receiver configured to receive such lane change requests, and thus does not receive the lane change request.

In other examples, however, a lane change request may be communicated via other means or multiple means. For example, the requesting vehicle 640 may transmit an RF message including a lane change request and may also activate a turn signal indicators or the driver of the vehicle may make an arm gesture indicating a desired lane change. Many vehicles are equipped with turn signal indicators both on the front and rear of the vehicle, and often on the sides as well, that will flash a light or lights corresponding to the direction of the desired lane change. Turn signal indicators are typically in the yellow/orange range of light and flash at a periodic rate, and therefore may be relatively easy to detect, even in a congested environment. Such flashing lights can be detected by nearby vehicles using image or light sensors, such as cameras or other light detectors. Detecting such turn signal indicators may be a receipt of a lane change request from a requesting vehicle in some examples according to this disclosure.

Lane change indicators (or arm gestures detailed below) may be employed in examples where the requesting vehicle is a manually-operated vehicle that lacks autonomous driving capabilities, or a vehicle that has only some autonomous features, such as lane detection and adaptive cruise control. Use of a blinker may enable such vehicles to transmit a lane change request to autonomous vehicles operating in adjacent lanes. For example, autonomous vehicles operating on a road may operate with very close spacing, e.g., vehicle spacing of a few car lengths or less than a car length, thus limiting the ability of other vehicles to merge in between them. For vehicles lacking vehicle-to-vehicle or other RF communication capabilities, it may be practically impossible to change lanes unless the autonomous vehicles can recognize a conventional lane change indicator (or arm gesture).

Arm gestures may employed, such as in the case where a vehicle lacks turn signal indicators, e.g., they are broken, or on vehicles with relatively small turn signal indicators, such as motorcycles, scooters, or bicycles. Standard arm gestures for lane changes are typically made by the driver of the vehicle and may include an arm held out a window and bent upwards at a ninety-degree angle to indicate a right turn or held straight out of the window parallel to the ground to indicate a left turn. Other non-standard arm signals may simply be a person pointing or gesturing in the direction of the desired lane change. In some cases, a passenger may make a standard arm gesture, but in a mirrored fashion as they may be located on the opposite side of the vehicle from the driver, etc. A mirrored fashion refers to the passenger making the standard gestures discussed above, but the signal indicates the opposite direction as discussed above. For example, an arm extended from the passenger side of a vehicle and bent upwards at a ninety-degree angle may indicate a left turn, while an arm extended straight out of the window and parallel to the ground may indicate a right turn. Other variations of arm gestures may be employed as well. In the foregoing examples, the described gestures are predicated on the driver being on the left side of the vehicle. In cases where the driver is on the right side of the vehicle, such arm signals may have the opposite or different meanings. Arm gestures may be detected and interpreted by other vehicles using CV techniques such as object recognition techniques or edge detection techniques. Detecting such arm gestures may be a receipt of a lane change request from a requesting vehicle in some examples according to this disclosure.

In this example, the lane change request is broadcasted by the requesting vehicle using an RF transmitter power setting suitable for a transmission range of approximately 200 meters; however, other power settings may be employed. In some examples, a lane change request may be transmitted as a point-to-point message directed to a specific vehicle, e.g., by specifically addressing the target vehicle or communicating via a directional antenna towards a target vehicle. A vehicle may identify nearby vehicles using sensor information such as LIDAR to detect nearby vehicles and ranges to them. Image sensors and a CV technique may be employed in some examples and may provide additional or complementary information to LIDAR information about nearby vehicles, such as license plate information or make and model information. Such information may enable the requesting vehicle to transmit a point-to-point message to one or more identified vehicles. For example, the requesting vehicle may communicate a license plate number for a target vehicle to a lane management system, such as the lane management system described below with respect to FIG. 10, and request information about the target vehicle's RF capabilities, such as a globally-unique or temporarily-unique identifier, e.g., a media access control (MAC) address, Internet Protocol (IP) address, cellular phone number, etc. After obtaining such information for one or more nearby vehicles, the requesting vehicle may transmit one or more point-to-point messages to such vehicles.

A lane change request may include information in addition to an indication of a desire to change lanes. For example, a message transmitted via an RF transmitter may carry information about the requesting vehicle 640, the requesting vehicle's 640 speed and current lane, the desired lane of travel, the urgency or priority of the request, minimum safe buffer distances (including differing buffer distance requirements for in front of or behind the requesting vehicle) or lane merge spacing, a time to complete the lane change (such as a minimum time to maintain a merge space), etc. Information about the requesting vehicle may include information such as a year, make, and model of the vehicle; the vehicle's vehicle identification number (VIN); the vehicle's dimensions; the vehicle's condition, including status of brakes, tires, engine, or any emergency or information about mechanical problems; driver condition, e.g., drowsy, asleep, unconscious, etc.; indicators as to whether the vehicle is an emergency vehicle, such as a police or fire vehicle, ambulance, etc.; or any other information suitable for informing the receiving vehicles 642b-c, 644 about conditions or other information that may be used in coordinating the lane change. A lane change request according to some examples may also include route information, such as a turn or an exit from a roadway the requesting vehicle 640 is scheduled to take, or a time or distance until a lane change is to be completed.

In this example, the lane change request indicates the vehicle's make and model, its lane of travel, its desired lane of travel, its speed, its GPS location, and a minimum acceptable merge space. Based on the lane change request, receiving vehicles 642b-c determine they are both travelling in the requesting vehicle's desired lane of travel, which indicates the middle lane 620, while receiving vehicle 644 determines it is not in the desired lane of travel and discards the lane change request. It should be appreciated that the desired lane of travel may indicate the right lane 630, despite the requesting vehicle 640 travelling in the left lane 610. In one such example, the receiving vehicles 642b-c, 644 may determine they are each in a desired lane of travel since the requesting vehicle 640 will need to traverse the middle lane 620 before reaching the right lane 630.

In some examples, a lane change request may be received by one or more vehicles, e.g., vehicles 642b-c, in close proximity to the requesting vehicle. The receiving vehicles may determine their proximity to the requesting vehicle based on information contained within the request, or based on characteristics of RF signals received from the requesting vehicle, such as Doppler information, signal strength, a timing signal, etc. The receiving vehicles may then further propagate the lane change request to other vehicles in the lane. For example, if receiving vehicles 642b-c are unable to accommodate a lane change request or are too far from the requesting vehicle (e.g., greater than 300 meters), they may identify other vehicles in the lane (as described below with respect to block 520) and transmit the lane change request on behalf of the requesting vehicle 640 to one or more other identified vehicles in the lane. These other vehicles may then act as receiving vehicles for purposes of this example method 500, acknowledges the lane change request by transmitting a response to the requesting vehicle, and execute a method according to this disclosure, such as the example method 500 of FIG. 5.

Such propagation of the lane change request may continue for a reference number of vehicles, or distance from the requesting vehicle. For example, the lane change request may be propagated up to a distance of approximately 300 meters behind the requesting vehicle or up to 100 meters ahead of the requesting vehicle. Upon propagating to such distances, vehicles may no longer propagate the lane change request, or may ignore a received lane change request.

It should be appreciated that positions discussed during this course of this method 500 may change over the course of time as the vehicles continue to travel along the road 600. Thus, in some examples, to maintain current absolute and relative position information, the requesting vehicle or the receiving vehicle(s) may periodically transmit or exchange position messages that include a then-current position, speed, rate of acceleration (or braking), traffic conditions, priority or urgency information, emergency conditions, etc. Means for performing the functions illustrated in block 510 can include, for example, the antenna 314 and wireless transceiver 312, or the processor 310 and memory 320 of FIG. 3, or the antenna 220 and computing device 210 of FIG. 2.

At block 520, the receiving vehicles 642b-c each determine one or more other vehicles located within their lane of travel 620. In this example, vehicle 642c is operating in an autonomous driving mode and employs sensors to detect other vehicles travelling on the road 600. In this example, vehicle 642c employs a LIDAR system that senses vehicles located ahead and behind the vehicle 642c, as well as to its sides. In addition, it employs image sensors to detect road features such as lane markings, other vehicles, and road signs. The vehicle 642c also employs a GPS system to obtain location and speed information.

In this example, unlike receiving vehicle 642c, vehicle 642b broadcasts an RF request at a transmit power capable of reaching all vehicles within approximately 200 meters of its position requesting each vehicle's then-current lane of travel. The request includes identification information for the vehicle 642b, such as a VIN or license plate number, its location as reported by a GNSS receiver on the vehicle 642b, and its current lane of travel 620. In response the vehicle 642b receives a response from vehicle 642c, but not from 642a. However, because vehicle 642b is also operating in an autonomous driving mode, it also employs sensors to detect nearby vehicles. In this example, like vehicle 642c, vehicle 642b employs a LIDAR system; however, in some examples, transmitting a broadcast request, e.g., via an RF transceiver, may enable detection of vehicles out of line-of-sight (LOS) but travelling in the same lane.

In this example, receiving vehicle 642c receives the broadcast request from receiving vehicle 642b and responds to the request. In examples, the response may include information about the vehicle 642c, such as its VIN, license plate number, or year, make, and model. The response may also include a lane of travel 620, a vehicle speed, a range to the requesting vehicle, or identification information related to one or more vehicles detected by vehicle 642c travelling in the same lane 620, such as vehicles detected by its LIDAR or image sensors. In this example, the response includes the vehicle's license plate number, its speed, and information about vehicle 642b, which receiving vehicle 642c detected via its LIDAR system. The information includes the detected range to vehicle 642b and its license plate number, which is obtained using CV techniques applied to one or more images captured by an image sensor on receiving vehicle 642c.

Vehicle 642b receives the response from vehicle 642c and determines, based on the response, that vehicle 642c is both located in the same lane as vehicle 642b, but also is directly behind it based on recognizing its own license plate number in the received response. Thus, receiving vehicle 642b determines that vehicles 642a and 642c are both travelling in the same lane 620 as it. Similarly, vehicle 642c determines that receiving vehicle 642b is located in the same lane as it based on vehicle 642b's broadcast message and sensor information, such as recognizing vehicle 642b's license plate using a CV system.

As discussed above, receiving vehicle 642b has determined that receiving vehicle 642c is travelling in the same lane 620 and is also directly behind it in the lane 620. It communicates this determination to the receiving vehicle 642c by transmitting a message using its RF transceiver. The message identifies the receiving vehicle 642c, the transmitting vehicle 642b, and an indication of travelling order within the lane. In this example, the indication of travelling order identifies vehicle 642a as the frontmost vehicle, vehicle 642b as the middle vehicle, and vehicle 642c as the rearmost vehicle. It should be appreciated that if other vehicles are detected, such an indication may further identify such other vehicles and their respective position within the travelling order. In this example, vehicle 642b was able to determine the travelling order based on information obtained from its sensors as well as from a message transmitted by receiving vehicle 642c. However, in some examples, multiple vehicles may generate such a travelling order over time by an exchange of messages, such messages identifying the transmitting vehicle and one or more detected adjacent vehicles. As vehicles receive such messages, they may construct the travelling order and transmit messages including the travelling order to other proximate vehicles, such as vehicles within 200 meters. Thus, vehicles may determine, in an ad hoc or peer-to-peer fashion, a travelling order in lane on a roadway.

While different examples of detecting other vehicles travelling in the same lane have been discussed above, it should be apparent that other techniques for determining vehicles travelling in the same lane may be employed. For example, a vehicle may communicate with a lane management system, such as the lane management system described below with respect to FIG. 10, to identify other vehicles travelling in the same lane as a vehicle. Such systems may obtain information from vehicles travelling along roadways, as discussed in co-pending U.S. patent application Ser. No. 15/081,665, entitled "Automated Lane Assignment for Vehicles," filed Mar. 25, 2016. Further, means for performing the functions illustrated in block 520 can include, for example, the antenna 314 and wireless transceiver 312, or the processor 310 and memory 320 of FIG. 3, or the antenna 220, computing device 210, or sensors 230, 240 of FIG. 2.

At block 530, the receiving vehicles 642b-c coordinate to establish a space to accommodate the requesting vehicle 640 in their lane of travel 620. In some examples, one or more of the receiving vehicles 642b-c may transmit an acknowledgement or other message to the requesting vehicle 640 indicating that it is attempting to establish space to accommodate the requested lane change, or a time at which the lane change request is expected to be accommodated, e.g., based on traffic conditions or routes taken by one or more of the receiving vehicles 642b-c.

In this example, the vehicles 642b-c employ a peer-to-peer technique to establish a space in their lane 620. Such a peer-to-peer technique may involve the transmission or exchange of multiple messages between the receiving vehicles 642b-c, and in some examples, may involve the transmission or exchange of messages with other vehicles travelling in the lane 620. For example, during the course of the coordination, the receiving vehicles 642b-c may exchange traffic information, e.g., braking or acceleration information or congestion information, position updates, vehicle spacing information, etc. Some messages may be periodic, such as position updates, while others may be event driven, such as messages indicating braking or acceleration or a new vehicle being detected, e.g., if such a vehicle merges into the lane 620. Thus, while certain messages and negotiations are discussed below, these additional messages may be exchanged in addition to the messaging discussed below, and information obtained from such messaging may be incorporated into the coordination techniques discussed below. For example, when the receiving vehicles 642b-c negotiate to establish a space or determine distances between them or the requesting vehicle 640, such negotiations or determinations may be based on the most current position or other information obtained, rather than on the initial lane change request or other initial messaging.

As discussed above, the receiving vehicles 642b-c have determined a travelling order of vehicles within the lane 620. Further, the receiving vehicles 642b-c have previously obtained information from the requesting vehicle 640 regarding a minimum acceptable merge space. The receiving vehicles 642b-c are also able to determine the requesting vehicle's proximity to each based on received GNSS position information. The receiving vehicles 642b-c are further able to determine that the requesting vehicle 640 is approximately alongside them by determine a range to the requesting vehicle 640 as well as a lateral separation based on the difference between the location of the requesting vehicle 640 and the location of each receiving vehicle 642b-c. Such information may enable each receiving vehicle 642b-c to determine the respective relative position of the requesting vehicle 640. Means for performing such a function include the computing device 210 of FIG. 2 and the processor 310 of FIG. 3.

After the receiving vehicles 642b-c determine that the requesting vehicle 640 is approximately alongside them based on the GPS position, they exchange messages to establish a space in the lane 620 between them. For example, they may negotiate a coordinating vehicle and one or more vehicles to be commanded by the coordinating vehicle.

As discussed above with respect to FIGS. 4A-4C, one vehicle may orchestrate or coordinate the lane change by obtaining information from other vehicles in the target lane 620 and commanding one or more of such vehicles to change speeds to establish a space for the requesting vehicle 640. In some examples, one of the vehicles may obtain the information from another vehicle or from a remote computing device, such as a lane management system.

For example, as discussed above, one vehicle may establish itself as the responding vehicle, or each of the receiving vehicles 642b-c may vote to establish a responding vehicle, e.g., vehicles may vote based on the respective proximity of each vehicle to the requesting vehicle, proximity of each vehicle to other receiving vehicles, proximity non-responsive vehicles, or a lack of proximate vehicles to one or more of the receiving vehicles. In some examples, each vehicle may get a single vote and a vehicle obtaining the largest vote total becomes the responding vehicle. In some examples, vehicles' votes may be weighted based on proximity to the requesting vehicle. For example, vehicles within 50 meters of the requesting vehicle may have a weight of 1, and vehicles weights are reduced by 0.2 for each additional 25 meters distance from the requesting vehicle. In some examples, weights may be reduced exponentially based on distance from the requesting vehicle such that vehicles 100 meters or more from the requesting vehicle have a weight of zero. Such schemes may allow one vehicle to coordinate multiple receiving vehicles to establish a space in a lane of travel, such as by coordinating braking or acceleration to establish a space.

In this example, however, the receiving vehicles 642*b*-*c* operate as peers and exchange information between them to establish the space. Thus, receiving vehicle 642*c* transmits a message to receiving vehicle 642*b* indicating that it has no vehicle behind it, and thus is the rearmost vehicle and can reduce its speed. In addition, vehicle 642*b* attempts to signal to vehicle 642*a*, the frontmost vehicle in this example, to change lanes by flashing its headlights. While vehicle 642*a* is not equipped with an RF transceiver and is being driven manually by its driver, it may respond to such communications. For example, in some locations, flashing headlights indicates a request to the vehicle to change lanes. Thus, by flashing its headlights, receiving vehicle 642*b* is able to attempt communications with vehicle 642*a*. If the request is not acknowledged or acted upon, receiving vehicle 642*b* may transmit a message to receiving vehicle 642*c* that it is unable to accelerate to create additional space between the two receiving vehicles 642*b*-*c*. Alternatively, if vehicle 642*a* changes lanes to either adjacent lane 610, 630, receiving vehicle 642*b* may transmit a message to receiving vehicle 642*c* indicating that it can accelerate to establish additional space between the vehicles.

In some examples, if receiving vehicle 642*b* unsuccessfully requests that vehicle 642*a* change lanes, e.g., by flashing its headlights, receiving vehicle 642*b* may itself change lanes. For example, it may change to either adjacent lane, which may provide additional space in the middle lane 620 to accommodate the requested lane change. In such an example, the receiving vehicle 642*b* may transmit a message to receiving vehicle 642*c* indicating that it has changed lanes and that receiving vehicle 642*c* is now trailing vehicle 642*a*. Receiving vehicle 642*c* may then determine a range to vehicle 642*a* and, if the space is greater than or equal to the minimum acceptable merge space identified by the requesting vehicle 640, the receiving vehicle 642*c* may respond to the requesting vehicle 640 that a space has been established in the middle lane 620 between the two vehicles 642*a,c*. If sufficient space is not established, receiving vehicle 642*c* may reduce its speed, such as by reducing throttle input or applying the brakes, until sufficient space is established between it and vehicle 642*a*.

While in this example the lane change request includes a minimum acceptable merge space, one or more receiving vehicles may employ minimum spacing parameters as well. For example, a tractor-trailer may require a minimum vehicle spacing of at least 50 meters in a highway setting. Thus, if a tractor-trailer receives a lane change request with a minimum acceptable merge space of 30 meters, the tractor-trailer may override the minimum acceptable merge space with its own minimum vehicle spacing requirement. Further, the tractor-trailer may transmit a response to the requesting vehicle, or to one or more vehicles in its lane indicating the modified lane change requirement.

In this example, however, receiving vehicle 642*b* is unable to change lanes due to the presence of vehicles 640 and 644, but vehicle 642*a* did respond to receiving vehicle's flashing headlights and moved into the right lane 630. Thus, it issues a command to vehicle 642*c* to reduce its speed to increase the space between the two vehicles 642*b*-*c*, while simultaneously increasing its own speed to make use of the additional space created when vehicle 642*a* changed lanes. Receiving vehicle 642*c* then reduces its speed until the distance between the vehicles 642*b*-*c* is at least as large as the minimum acceptable merge space. In some examples, vehicle 642*c* may detect the distance between it and vehicle 642*b*, or vehicle 642*b* may monitor the distance and, upon detecting sufficient space has been established, transmit a message to vehicle 642*c* that it may resume the same speed as vehicle 642*b*, e.g., by transmitting a message indicating that sufficient space has been established and a speed of vehicle 642*b*.

While in this example, the two vehicles 642*b*-*c* were able to coordinate to establish a space between them, in some examples, the vehicle 642*b*-*c* may be unable to do so. For example, one or both vehicles 642*b*-*c* may determine that they are unable to adjust their speeds to create a space, or one or both vehicles may be travelling together, e.g., in a convoy, and thus are configured to not allow vehicles to merge between them.

If one or more of the receiving vehicles 642*b*-*c* is unable to accommodate the request, it may propagate the lane change request to other vehicles within the lane 620. For example, if additional vehicles are travelling behind vehicle 642*c*, it may transmit the lane change request to one or more such vehicles on behalf of the requesting vehicle 640 and identifying the requesting vehicle 640 as the initiator of the request. One or more such trailing vehicles may then begin a method according this disclosure to establish a space to accommodate the requesting vehicle 640. Further, one or more of the trailing vehicles may transmit a message to the requesting vehicle 640 to acknowledge that the lane change request has been received. Such a technique may allow the lane change request to be accommodated over a larger area than between vehicles travelling next to, or within close proximity to, the requesting vehicle 640.

While in the examples discussed above, the vehicles 642*a*-*c* coordinate with each other to establish a merge space for the requesting vehicle 640, in some examples, a responding vehicle may obtain information from a remote system, such as a lane management system, instructing the responding vehicle as to where to establish a merge space for the requesting vehicle or identifying one or more other vehicles with which to coordinate a lane change request. For example, if vehicle 642*b* is the responding vehicle, it may communicate with a lane management system, which may then determine the locations of vehicles 640 and 642*a*-*c*, determine between which of vehicles 642*a*-*c* to establish a space for the requesting vehicle 640, including parameters such as a size of the space to establish or a minimum distance in which to establish the space, and communicate the determination to the responding vehicle 642*b*. If the vehicles 642*a*-*c* are operating in a peer-to-peer mode where no one vehicle is a responding vehicle, each of the vehicles 642*a*-*c* may communicate with the lane management system to determine where to establish the merge space and, in some examples, a minimum distance between the vehicles to establish the space. Thus, the responding vehicle may obtain a determination of which two vehicles of multiple vehicles between which to establish a merge space.

In some examples, the vehicles involved in responding to the request may also maintain information tracking the number of merges allowed within a time period, e.g., the last 60 seconds. If one or both vehicles has allowed more than a reference number of vehicles to merge in front of it within the time period, the vehicle may deny the request or propagate the request to one or more vehicles trailing it as discussed above. Such a technique may ensure that one vehicle is not endlessly allowing vehicles to merge in front of it, such as in heavy traffic conditions. To provide such a feature, a vehicle may employ a leaky bucket-type technique wherein for each vehicle allowed to merge in front of it, the vehicle adds a "token" to a bucket, or increases the value of a counter. The vehicle then removes a token from the bucket, or decreases the value of the counter periodically, e.g., every 60 seconds. If the value the counter (or number of tokens in the bucket) exceeds a threshold, the vehicle will not accommodate a lane change request from another vehicle, though this may be overridden at the driver's preference or based on a priority request, e.g., from an emergency vehicle.

In some examples, alternate techniques may be employed, such as a backoff timer, where after a vehicle accommodates a lane change request, it will not accommodate another lane change request, absent driver intervention or a priority request, e.g., from an emergency vehicle, for a period of time, e.g., 60 seconds. Further, means for performing the functions illustrated in block 530, including coordinating with the second vehicle to establish a space to accommodate the requesting vehicle in the lane of travel, and coordinating with the second and third vehicles to establish the space, can include, for example, the processor 310 of FIG. 3, or the computing device 210 of FIG. 2.

At block 540, one or both vehicles transmit a lane change response to the requesting vehicle 640. In this example, because the vehicles 640b-c were able to establish a space that satisfies the requesting vehicle's lane change request, one or both vehicles respond to the requesting vehicle that a space has been established between the two vehicles 642b-c.

In this example, the receiving vehicles 642b-c each acts as a responding vehicle. Thus, each transmits a lane change response via an RF transceiver to the requesting vehicle. Responding vehicle 642c responds that the space has been established and provides its current location. Similarly responding vehicle 642b also responds that the space has been established, and provides its current location. Thus, the requesting vehicle 640 is provided with an acknowledgement that a space has been established, and the positions of the two vehicles at either ends of the space. Thus, the requesting vehicle 640 is able to determine the location of the space and then proceed into the established space.

It should be appreciated that a lane change response may include other information or additional information as discussed above in different examples. For example, a lane change response may include one or more of a lane change timing (such as a time when a merge space will become available or a duration that the merge space will be held open), a target speed for the requesting vehicle, etc.

In this example, prior to changing lanes, the requesting vehicle 640 responds to the responding vehicles 642b-c to indicate that it is beginning the merge. Further, after the requesting vehicle 640 has completed the merge, it may transmit a further message indicating that the merge is complete. In some examples, one or more of the responding vehicles 642b-c may also detect completion of the merge based on one or more sensor signals, e.g., from a LIDAR sensor or an image sensor.

Further, in some examples, one or more responding vehicles may be able to transmit a message to the requesting vehicle to cancel or abort a lane change. For example, vehicle 642b may detect that another vehicle has accelerated and quickly taken the established space before the requesting vehicle 640 is able to perform the merge. After detecting such a maneuver, vehicle 642b transmits one or more interrupt messages to cancel the previously-transmitted lane change acknowledgement. The responding vehicles 642b-c may then attempt to restart the coordination or may transmit a response to the requesting vehicle 640 that the lane change request can no longer be accommodated. The requesting vehicle 640 may then transmit a new lane change request, or one or more of the responding vehicles 642b-c may propagate the request to one or more other vehicles in the lane 620.

In some examples, however, a space may not be established. In one example, a responding vehicle (or vehicles) may transmit a response to the lane change request indicating that the lane change request has been denied. Thus, the requesting vehicle may travel ahead of the responding vehicles, or drop back behind them, and issue a new request for a lane change.

As discussed above, the requesting vehicle 640 may actually seek to move to the right lane 630, thus after reaching the middle lane 620, it may repeat the method 500 of FIG. 5, such as by transmitting a further lane change request, which may be received by one or more vehicles in the right lane, such as vehicle 644. In some examples, the requesting vehicle 640 may transmit a message to vehicle 644 to indicate that a first portion of a lane change has completed and the requesting vehicle 640 is ready to merge into the right lane 630. Further, means for performing the functions illustrated in block 540 can include, for example, the antenna 314 and wireless transceiver 312, or the processor 310 and memory 320 of FIG. 3, or the antenna 220 or computing device 210 of FIG. 2.

While this example has been discussed with respect to two responding vehicles 642b-c that are each equipped with RF transceivers, in some examples, both vehicles may not have such RF transceivers. The example method 500 shown in FIG. 5 will now be discussed with respect to such an example and reference will be made to the travelling environment shown in FIGS. 7A-7C.

Figure 7A:
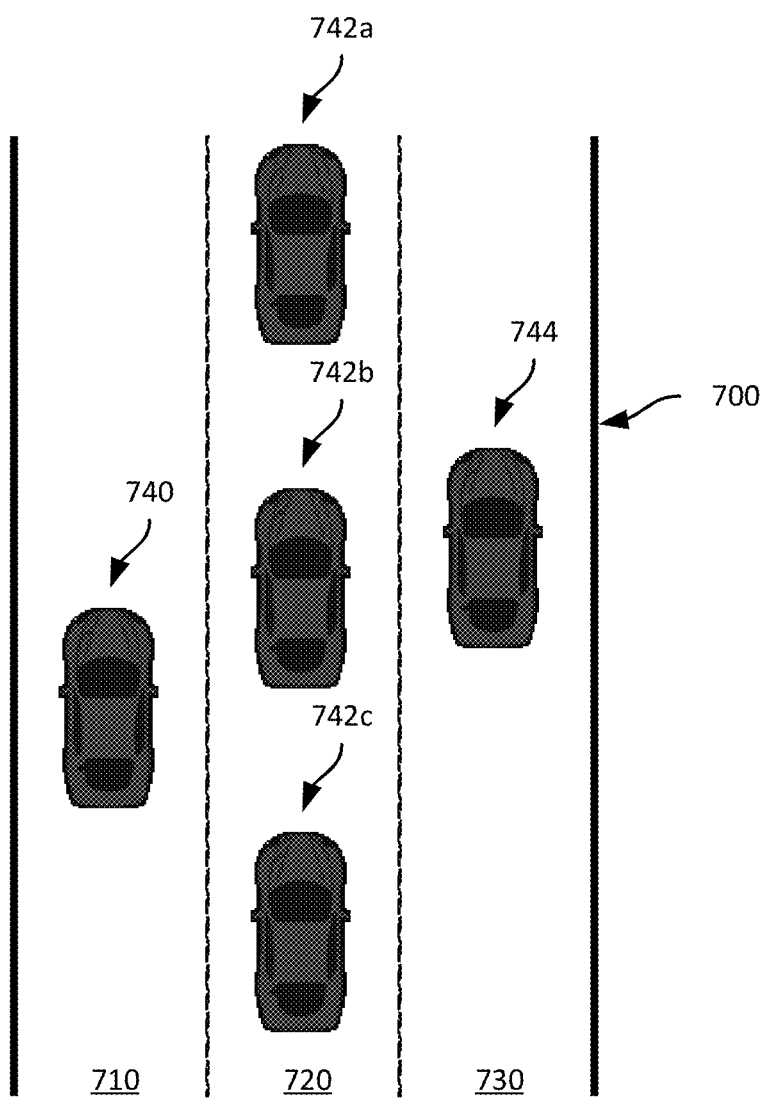
Figure 7B:
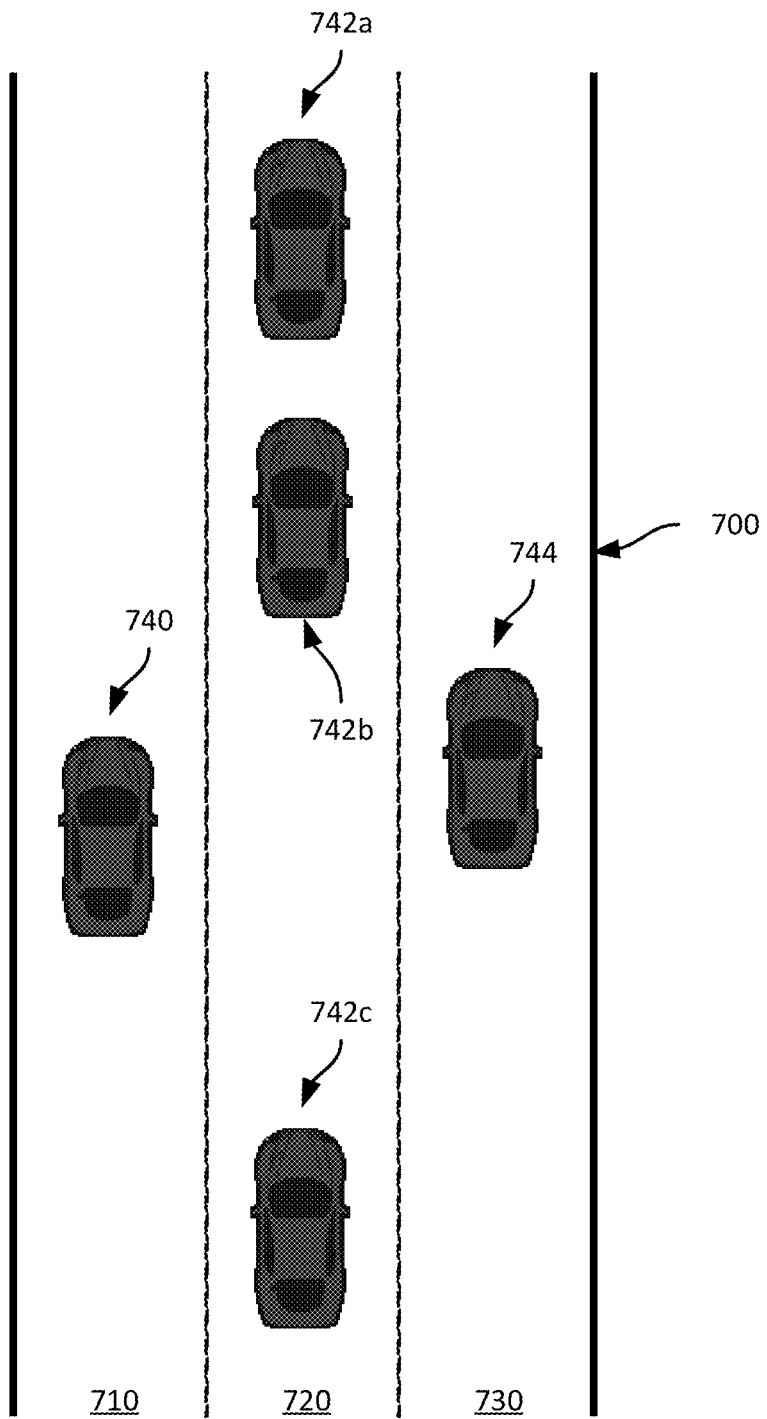

At block 510, a requesting vehicle 740, the first vehicle 740 in this example, travelling in the left lane 710 of a road 700, shown in FIG. 7A, transmits a request for a lane change generally as discussed above. However, in this example, only vehicles 742c, 744 are equipped with an RF transceiver. Thus, vehicles 742a-b do not receive the request and vehicle 744, travelling in the right lane, 730, ignores the request because it is not in the correct lane to accommodate the requested lane change.

At block 520, receiving vehicle 742c detects other vehicles in its lane 720 generally as discussed above, and identifies vehicle 742b, the second vehicle in this example, and may identify vehicle 742a, depending on LOS or sensors available to the vehicle 742c.

At block 530, the receiving vehicle 742c coordinates with the other vehicles to establish a space to accommodate the requesting vehicle 740. In this example, receiving vehicle 742c is unable to communicate with the other vehicles 742a-b in its lane, and instead, establishes a space by reducing its speed until it establishes a space at least as long as minimum acceptable merge space identified by the requesting vehicle 740 as may be seen in FIG. 7B. The receiving vehicle 742c determines the size of the established space using one or more sensors, e.g., LIDAR, RADAR, image sensor, etc., to determine a distance to vehicle 742b. In some examples, vehicle 742c may be able to establish the space, even if other vehicles are travelling behind it, as by applying its brakes or reducing its speed, the trailing vehicles will also reduce their speed or otherwise accommodate the vehicle's reduction in speed. In this example, receiving vehicle 742c obtains a determination of two out of three vehicles, vehicles 742a-c, between which to establish the space by making the determination itself.

Figure 7C:
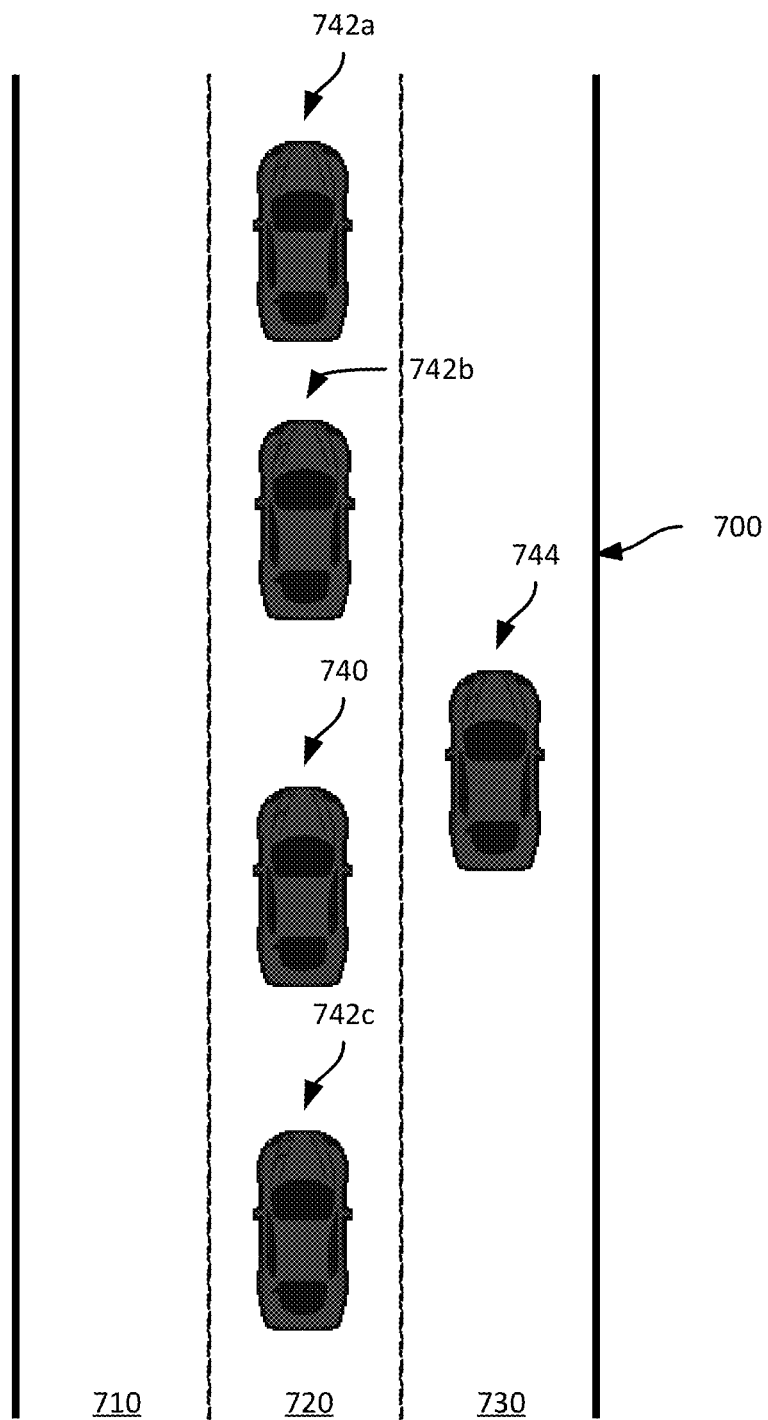

At block 540, receiving vehicle 742c becomes a responding vehicle and transmits a lane change response to the requesting vehicle 740. In this example, the response includes the location of the responding vehicle 742c, a distance between the responding vehicle 742c and vehicle 742b, and a speed of responding vehicle 742c. Such information may allow the requesting vehicle 740 to locate the responding vehicle 742c and also the established space to complete the lane change as shown in FIG. 7C.

The example method 500 shown in FIG. 5 will now be discussed again with respect to FIGS. 7A-7C and an example involving one vehicle being designated as a coordinating vehicle, while other vehicles involved in establishing a space in a lane are designated as commanded vehicles.

At block 510, a requesting vehicle 740 travelling in the left lane 710 of a road 700, shown in FIG. 7A, transmits a request for a lane change generally as discussed above. In this example, each of vehicles 742a-c (i.e., vehicle 742a, vehicle 742b, and vehicle 742c), and 744 is equipped with a RF transceiver. Thus, each of vehicles 742a-c, 744 receives the lane change request; however, vehicle 744 ignores the request as it is not in the target lane.

At block 520, the receiving vehicles 742a-c detect other vehicles in their lane 720 generally as discussed above. Thus, each of vehicles 742a-c detects each of the other vehicles' presences.

At block 530, the receiving vehicles 742a-c coordinate to establish a space to accommodate the requesting vehicle 740 in their lane of travel 720. In this example, however, the vehicles 742a-c designate a coordinating vehicle. As discussed above, the vehicles 742a-c may make such a designation based on proximity to the requesting vehicle 740, based on weighted voting, etc. In this example, the vehicles 742a-c designate vehicle 742b as the coordinating vehicle, while vehicles 742a,c are designated as commanded vehicles. Thus, the commanded vehicles 742a,c await instruction from the coordinating vehicle 742b, but supply sensor information as well as vehicle status information to the coordinating vehicle 742b. Such sensor information may include detected vehicles, distance between detected vehicles, and identities of detected vehicles. Vehicle status information may include throttle or brake information, speed, location, etc.

The coordinating vehicle 742b receives such information and determines two vehicles between which to establish a space to accommodate requesting vehicle 740. In this example, the coordinating vehicle 742b determines that the requesting vehicle 740 should merge between vehicle 742b and 742c based on calculated distances between the requesting vehicle 740 and each of the vehicles 742a-c involved in coordinating the lane change. In this example, the requesting vehicle 740 is closest to vehicles 742b-c (i.e., vehicle 742b and vehicle 742c), thus vehicle 742b determines to establish a space between vehicles 742b-c. Also, in this example, coordinating vehicle 742b obtains a determination of which two of three vehicles, vehicles 742a-c, between which to establish the space by making the determination itself. From the perspective of vehicle 742c, the determination was obtained by receiving the determination from the coordinating vehicle 742b. Means for performing such functions, including determining two vehicles between which to establish a space, include the processor 310 of FIG. 3 or the computing device 210 of FIG. 2.

To establish the space, coordinating vehicle 742b commands vehicle 742a to accelerate based on vehicle 742a indicating that no vehicles are located in front of it. Similarly, vehicle 742b accelerates to maintain its relative position to vehicle 742a. Finally, coordinating vehicle 742b commands vehicle 742c to decelerate to increase a separation between vehicles 742b and 742c.

After issuing the commands, coordinating vehicle 742b monitors the distance between it and vehicle 742c. When the space between the two vehicles reaches a threshold size, e.g., based on a requested minimum acceptable space, the coordinating vehicle 742b commands each of vehicles 742a,c to resume their prior speeds, thereby maintaining the established space.

At block 540, the coordinating vehicle transmits a response to the requesting vehicle 740 indicating that a space has been established. In this example, the response provides the location of the established space, e.g., by providing the respective locations of vehicles 742b-c. After the requesting vehicle 740 merges into the established space, the coordinating vehicle 742b instructs vehicles 742a,c to resume normal operation and the coordinating vehicle 742b de-designates itself as a coordinating vehicle.

Figure 8:
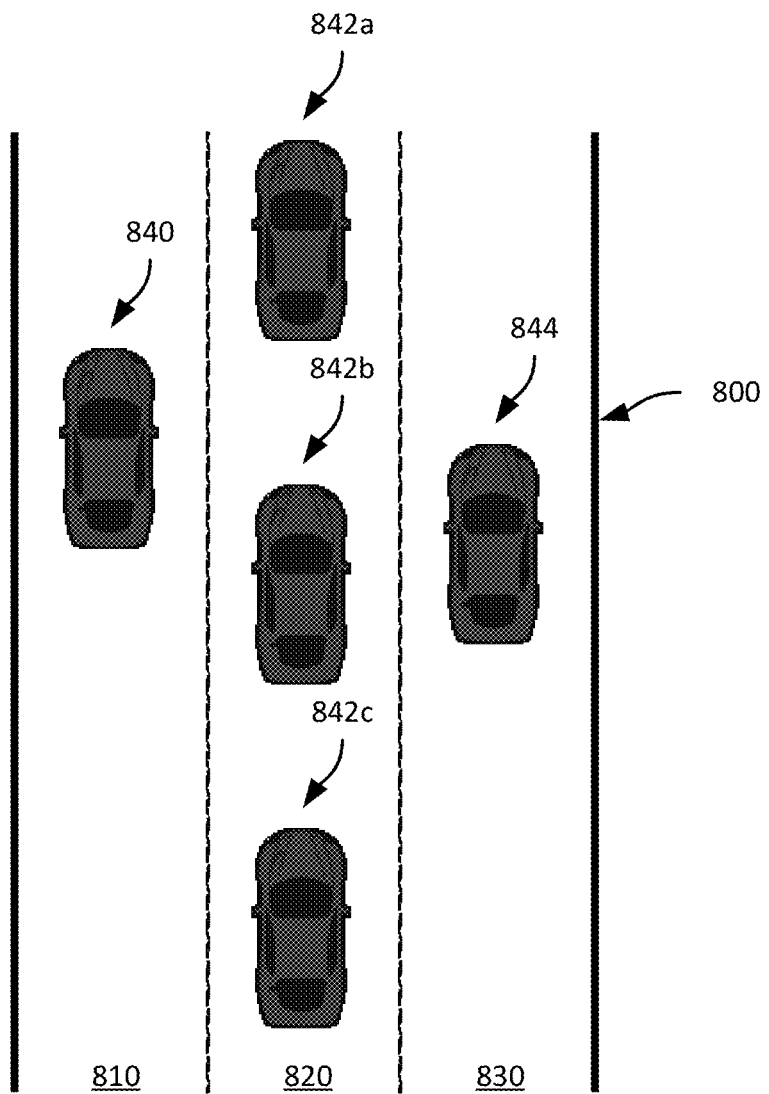

Referring now to FIG. 8, FIG. 8 shows an example scenario, similar to the example discussed above with respect to FIG. 4; however, in this example, the requesting vehicle 840 transmits a lane change request to responding vehicle 842c. Responding vehicle 842c determines other vehicles travelling in its lane generally as discussed above with respect to block 520 of FIG. 5, and determines that the requesting vehicle 840 is nearer to vehicles 842a and 842b, and thus the responding vehicle 842c is less well-suited to coordinate a lane change and vehicle 842b should coordinate the lane change. Thus, the responding vehicle 842c transmits a response to the requesting vehicle 840 indicating that vehicle 842b should coordinate the requested lane change. The requesting vehicle 840 then transmits a lane change request to vehicle 842b, which becomes the new responding vehicle 842b. Responding vehicle 842b then coordinates the lane change for the requesting vehicle 840 generally as discussed above with respect to the method 500 of FIG. 5. Means for performing the functions discussed above, including determining two of the first, second, or third vehicles between which to establish the space, include the processor 310 of the computing device 210 in FIG. 3, or the computing device 210 shown in FIG. 2.

While various example methods according to the method 500 shown in FIG. 5 are discussed above, it should be appreciated that in some examples, one or more responding vehicles may be configured by their respective drivers to respond in differing ways to a lane change request. For example, a driver may configure their vehicle to deny any lane change requests, except those from emergency vehicles (or other high-priority lane change requests). In some examples, responding vehicles may negotiate or determine capabilities with respect to the requesting vehicle. A requesting vehicle that has high quality or sophisticated autonomous driving features may enable one or more responding vehicles to respond more quickly or to employ tighter tolerances for merge spacing, timing, vehicle speed, etc., which may enable the requesting vehicle to merge more quickly and into a smaller merge space. In other examples, a requesting vehicle may have rudimentary or partial-autonomous capabilities, and thus the responding vehicles may employ increased merge spacing, reduced merge speed, or deny the request entirely. If a requesting vehicle entirely lacks autonomous capabilities or lacks RF capabilities, e.g., a lane request is initiated via turn signal, the responding vehicles may employ larger merge spaces, such as 5-6 car lengths, and visual indicators, such as headlight flashing, to respond to the merge request.

Figure 9:
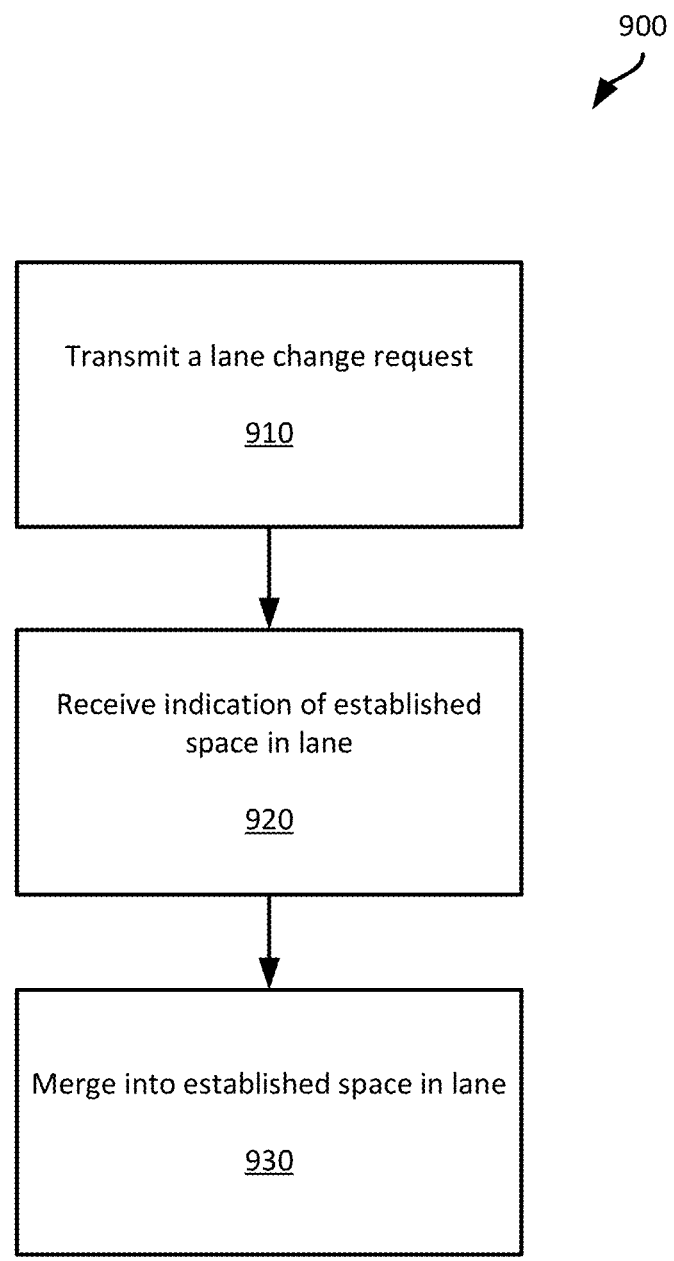
FIG. 9 shows an example method for coordinated lane-change negotiations between vehicles.

Referring now to FIG. 9, FIG. 9 shows an example method 900 for coordinated lane-change negotiations between vehicles.

At block 910, a requesting vehicle transmits a lane change request using an RF transmitter. As discussed above with respect to block 510 of the method 500 shown in FIG. 5, a lane change request may include a wide variety of information according to different examples.

At block 920, the requesting vehicle receives a response from one or more responding vehicles. As discussed above, a response may include a denial of the request. If the request was denied, the requesting vehicle may wait a timeout period before transmitting a new request. In some examples, the requesting vehicle may transmit a request to identify other nearby vehicles. If the same, or some of the same vehicles, remain near the requesting vehicle, it may delay transmitting a further lane change request as it may determine that the scenario has not yet changed sufficiently to allow for a lane change. However, if the requesting vehicle detects new vehicles, or a majority of the responding vehicles were not vehicles in its vicinity when the last lane change request was denied, the requesting vehicle may transmit a new lane change request.

At block 930, if the requesting vehicle received a lane change response indicating that a space has been established, the requesting vehicle merges into the established space. In this example, the requesting vehicle determines a location of the responding vehicle and determines a location of the established space relative to the responding vehicle. For example, if the responding vehicle indicates that the established space is located in front of the responding vehicle, the requesting vehicle may adjust its speed to catch up to the responding vehicle, or allow the responding vehicle to catch up to the requesting vehicle. In addition, the requesting vehicle may employ one or more sensors to detect an open space in the desired lane adjacent to the requesting vehicle. Thus, the requesting vehicle may determine it is adjacent to the established space based on its relative position with respect to the responding vehicle and based on detecting an open space in the desired lane. After locating the established space, the requesting vehicle may change lanes into the established space.

In some examples, the requesting vehicle may continue to exchange messages with the responding vehicle to coordinate a lane change. For example, the requesting vehicle may exchange messages having position information with the responding vehicle. The requesting vehicle, or the responding vehicle, may use the messages, or RF parameters such as Doppler information, signal strength, timing signals, etc., to determine relative positions between the vehicles, or to determine rates of change of the relative position, and adjust speeds based on the relative position or rate of change of relative position. The requesting vehicle may then determine its position relative to the responding vehicle and the established space based on the exchanged messages, and merge into the established space once it has determined it is adjacent to it.

In some examples, the responding vehicle may detect when the requesting vehicle is adjacent to the established space, and transmit a message to the requesting vehicle indicating it should change lanes into the established space.

For example, the responding vehicle may identify the requesting vehicle using CV information, location information, RF parameters, or any combination. For example, the responding vehicle may recognize the requesting vehicle based on a CV recognition of a license plate and compare the recognized license plate with license plate information contained in the lane change request. The responding vehicle may then determine a range to the requesting vehicle and, when the requesting vehicle is at a distance adjacent to the established space, the responding vehicle may transmit a message indicating that the requesting vehicle may merge into the established space. The requesting vehicle may then merge into the established space in the lane.

Figure 10:
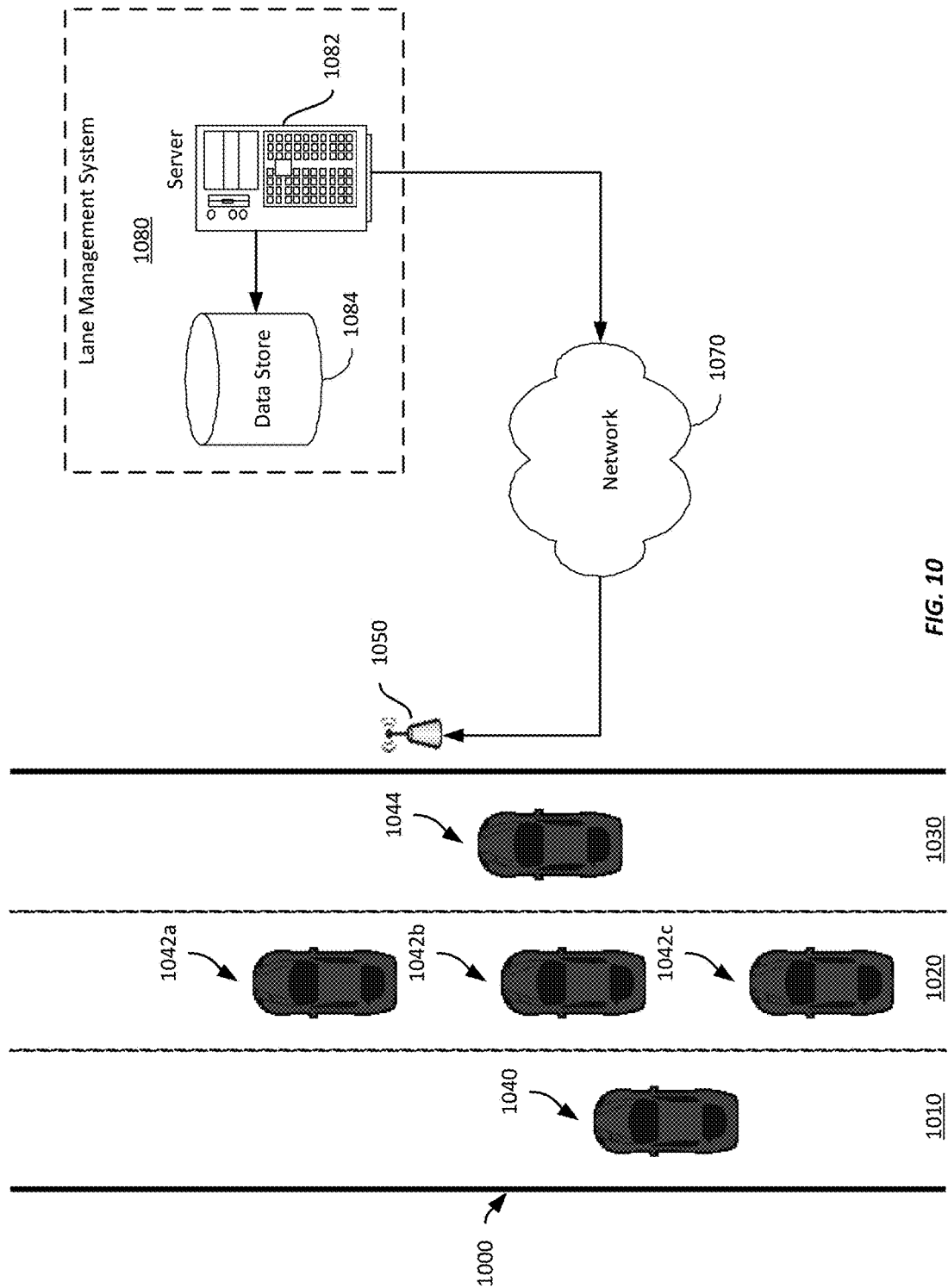
FIG. 10 shows an example system for coordinated lane-change negotiations between vehicles.

Referring now to FIG. 10, FIG. 10 shows an example system for coordinated lane-change negotiations between vehicles. In this example, the system includes a lane management system 1080, which includes one or more servers 1082 and one or more data stores 1084, and is in communication with one or more of the vehicles 1040, 1042*a-c*, and 1044 travelling on road 1000 via the network 1070 and wireless transceiver 1050. The server(s) 1082 may be any suitable computing device according to this disclosure, such as the computing device described with respect to FIG. 3, and may perform any methods, or parts of methods, according to this disclosure, including the various methods described above with respect to FIG. 5 and FIGS. 6A-6C, 7A-7C, and 8. For example, the lane management system 1080 may receive messages from one or more requesting vehicles and identify and communicate the request to one or more nearby vehicles that may act as responding vehicles. Further, the lane management system 1080 may receive messages from one or more responding vehicles and coordinate a requested lane change with the responding vehicle(s) as generally as described above with respect to FIGS. 5, 6A-6C, 7A-7C, and 8. Thus, the lane management may stand in to perform one or more operations for a requesting or responding vehicle according to different examples, and communicate the results of such operations to the requesting or responding vehicles, as appropriate.

While the methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A method comprising:
   receiving, by a computing device of a first vehicle, a lane change request from a requesting vehicle, the requesting vehicle requesting to change to a lane of travel occupied by the first vehicle;
   identifying, by the computing device, a second vehicle in the lane of travel;
   coordinating with the second vehicle to establish a space to accommodate the requesting vehicle in the lane of travel; and
   transmitting a lane change response to the requesting vehicle.

2. The method of claim 1, wherein the second vehicle is directly in front of the first vehicle or directly behind the first vehicle.

3. The method of claim 2, wherein the coordinating comprises:
   determining a distance between the first and second vehicles;
   determining a minimum distance to establish the space; and
   communicating the minimum distance and a command to change a travelling speed to the second vehicle to establish the space.

4. The method of claim 1, further comprising:
   identifying, by the first vehicle, a third vehicle in the lane of travel; and
   coordinating with the second and third vehicles to establish the space.

5. The method of claim 4, wherein the coordinating comprises:
   determining two of the first, second, or third vehicles between which to establish the space;
   determining a minimum distance to establish the space; and
   communicating the minimum distance and a command to change a travelling speed to at least one of the two determined vehicles to establish the space.

6. The method of claim 5, wherein the determining the two vehicles comprises:
   determining a position of the requesting vehicle;
   determining a distance between the requesting vehicle and each of the first, second, and third vehicles; and
   determining a travelling order of the first, second, and third vehicles.

7. The method of claim 6, wherein communicating the minimum distance and the command to change the travelling speed comprises:
   communicating a command to increase speed to a frontmost vehicle of the first, second and third vehicles, and
   communicating a command to reduce speed to a rearmost vehicle of the first, second, and third vehicles.

8. The method of claim 1, wherein receiving the lane change request from the requesting vehicle comprises detecting, using an image sensor, an activated turn signal on the requesting vehicle.

9. The method of claim 1, wherein receiving the lane change request from the requesting vehicle comprises receiving a radio frequency communication from the requesting vehicle.

10. The method of claim 1, wherein the lane change response indicates the established space.

11. The method of claim 1, wherein coordinating with the second vehicle comprises determining the second vehicle should coordinate the lane change request, and wherein the lane change response indicates the second vehicle to handle the lane change request.

12. A device comprising:
    a radio frequency (RF) transceiver;
    a non-transitory computer-readable medium; and
    a processor in communication with the RF transceiver and the non-transitory computer-readable medium, the processor configured to:
      receive a lane change request from a requesting vehicle, the requesting vehicle requesting to change to a lane of travel occupied by a first vehicle comprising the device;
      identify a second vehicle in the lane of travel;
      coordinate, using the RF transceiver, with the second vehicle to establish a space to accommodate the requesting vehicle in the lane of travel; and
      transmit a lane change response to the requesting vehicle.

13. The device of claim 12, wherein the second vehicle is directly in front of the first vehicle or directly behind the first vehicle.

14. The device of claim 13, wherein the processor is further configured to:
    determine a distance between the first and second vehicles;
    determine a minimum distance to establish the space; and communicate the minimum distance and a command to change a travelling speed to the second vehicle to establish the space.

15. The device of claim 12, wherein the processor is further configured to:
identify a third vehicle in the lane of travel; and
coordinate with the second and third vehicles to establish the space.

16. The device of claim 15, wherein the processor is further configured to:
obtain a determination of two of the first, second, or third vehicles between which to establish the space;
determine a minimum distance to establish the space; and
communicate, using the RF transceiver, the minimum distance and a command to change a travelling speed to at least one of the two determined vehicles to establish the space.

17. The device of claim 16, wherein the processor is further configured to:
determine a position of the requesting vehicle;
determine a distance between the requesting vehicle and each of the first, second, and third vehicles; and
determine a travelling order of the first, second, and third vehicles.

18. The device of claim 17, wherein the processor is further configured to:
communicate, using the RF transceiver, a command to increase speed to a frontmost vehicle of the first, second and third vehicles, and
communicate, using the RF transceiver, a command to reduce speed to a rearmost vehicle of the first, second, and third vehicles.

19. The device of claim 12, further comprising an image sensor, and wherein the processor is further configured to detect, using the image sensor, an activated turn signal on the requesting vehicle.

20. The device of claim 12, wherein the processor is further configured to receive a radio frequency communication from the requesting vehicle.

21. The device of claim 12, wherein the lane change response indicates the established space.

22. The device of claim 12, wherein the processor is further configured to determine the second vehicle should coordinate the lane change request, and wherein the lane change response indicates the second vehicle to handle the lane change request.

23. An apparatus comprising:
means for receiving a lane change request from a requesting vehicle, the requesting vehicle requesting to change to a lane of travel occupied by a first vehicle comprising the apparatus;
means for identifying a second vehicle in the lane of travel;
means for coordinating with the second vehicle to establish a space to accommodate the requesting vehicle in the lane of travel; and
means for transmitting a lane change response to the requesting vehicle.

24. The apparatus of claim 23, further comprising:
means for determining a distance between the first and second vehicles;
means for determining a minimum distance to establish the space; and
means for communicating the minimum distance and a command to change a travelling speed to the second vehicle to establish the space.

25. The apparatus of claim 23, further comprising means for detecting an activated turn signal on the requesting vehicle.

26. The apparatus of claim 23, further comprising means for receiving a radio frequency communication from the requesting vehicle.

27. A non-transitory computer-readable medium comprising processor-executable program code stored in the non-transitory computer-readable medium to cause a processor to:
receive a lane change request from a requesting vehicle, the requesting vehicle requesting to change to a lane of travel occupied by a first vehicle;
identify a second vehicle in the lane of travel;
coordinate with the second vehicle to establish a space to accommodate the requesting vehicle in the lane of travel; and
transmit a lane change response to the requesting vehicle.

28. The non-transitory computer-readable medium of claim 27, wherein the processor is further configured to execute processor-executable program code stored in the non-transitory computer-readable medium to:
determine a distance between the first and second vehicles;
determine a minimum distance to establish the space; and
communicate the minimum distance and a command to change a travelling speed to the second vehicle to establish the space.

29. The non-transitory computer-readable medium of claim 27, wherein the processor is further configured to execute processor-executable program code stored in the non-transitory computer-readable medium to detect, using a signal from an image sensor, an activated turn signal on the requesting vehicle.

* * * * *